United States Patent
Suwa et al.

(10) Patent No.: US 8,920,592 B2
(45) Date of Patent: Dec. 30, 2014

(54) HEAT ACTIVATED OPTICALLY CLEAR ADHESIVE FOR BONDING DISPLAY PANELS

(75) Inventors: Toshihiro Suwa, Sagamihara (JP); Yasuhiro Kinoshita, Tokyo (JP); Albert I. Everaerts, Oakdale, MN (US); Abdujabar K. Dire, Woodbury, MN (US)

(73) Assignee: 3M Innovation Properties Company, St. Paul, MN (US)

( * ) Notice: Subject to any disclaimer, the term of this patent is extended or adjusted under 35 U.S.C. 154(b) by 117 days.

(21) Appl. No.: 13/580,429

(22) PCT Filed: Mar. 4, 2011

(86) PCT No.: PCT/US2011/027178
§ 371 (c)(1),
(2), (4) Date: Aug. 22, 2012

(87) PCT Pub. No.: WO2011/112447
PCT Pub. Date: Sep. 15, 2011

(65) Prior Publication Data
US 2012/0325402 A1 Dec. 27, 2012

Related U.S. Application Data

(60) Provisional application No. 61/311,961, filed on Mar. 9, 2010, provisional application No. 61/421,935, filed on Dec. 10, 2010.

(51) Int. Cl.
*B32B 37/04* (2006.01)
*B32B 37/12* (2006.01)
*C09J 5/06* (2006.01)

(52) U.S. Cl.
CPC ............... *B32B 37/1207* (2013.01); *C09J 5/06* (2013.01); *B32B 2457/20* (2013.01); *G02F 2202/28* (2013.01); *C09J 2201/61* (2013.01); *C09J 2203/318* (2013.01); *C09J 2433/00* (2013.01); *C09J 2467/00* (2013.01); *C09J 2475/00* (2013.01); *C09J 2483/00* (2013.01)
USPC ..................................................... 156/275.5

(58) Field of Classification Search
CPC ........ B29C 65/02; B29C 65/14; B29C 65/48; B29C 65/483; B29C 65/4835; B29C 65/4845; B32B 37/04; B32B 37/06; B32B 37/12; B32B 37/1207
USPC ........ 156/275.5, 272.2, 329, 331.7, 332, 334, 156/99, 106, 102
See application file for complete search history.

(56) References Cited

U.S. PATENT DOCUMENTS

| 4,737,559 A | 4/1988 | Kellen et al. |
| 5,128,388 A | 7/1992 | Komori et al. |

(Continued)

FOREIGN PATENT DOCUMENTS

| CN | 201662668 | 12/2010 |
| DE | 20 2007 015 019 | 3/2008 |

(Continued)

*Primary Examiner* — Daniel McNally
(74) *Attorney, Agent, or Firm* — Ann K. Gallagher

(57) ABSTRACT

A method of making a display assembly includes the steps of (a) attaching a first substrate and a second substrate with an optically clear heat activated adhesive to form a laminate. Each of the first and second substrate has opposing major surfaces. At least one of the first and second substrate has a three dimensional surface topography covering at least a portion of one of its major surfaces or is distortion sensitive. At a heat activation temperature, the adhesive is pressure sensitive. The method also includes heating the laminate to the heat activation temperature of the adhesive causing the adhesive to flow. The activation temperature is greater than 40° C. and less than 120° C.

20 Claims, 12 Drawing Sheets

(56) References Cited

U.S. PATENT DOCUMENTS

| | | |
|---|---|---|
| 5,637,646 A | 6/1997 | Ellis |
| 6,310,612 B1 * | 10/2001 | Kotsubo et al. ............... 345/173 |
| 6,720,387 B1 | 4/2004 | Stark et al. |
| 6,800,680 B2 | 10/2004 | Stark et al. |
| 6,806,320 B2 | 10/2004 | Everaerts et al. |
| 7,255,920 B2 | 8/2007 | Everaerts et al. |
| 7,494,708 B2 | 2/2009 | Everaerts et al. |
| 2003/0089516 A1 | 5/2003 | Hattori et al. |
| 2004/0191509 A1 * | 9/2004 | Kishioka et al. .............. 428/354 |
| 2006/0155000 A1 | 7/2006 | Inenaga |
| 2008/0011419 A1 | 1/2008 | Everaerts et al. |
| 2008/0194163 A1 | 8/2008 | Swan et al. |
| 2009/0029100 A1 | 1/2009 | Wigdorski et al. |
| 2009/0162645 A1 | 6/2009 | Matsuhira |
| 2009/0322705 A1 * | 12/2009 | Halsey, IV .................... 345/174 |
| 2010/0038023 A1 | 2/2010 | Kho et al. |

FOREIGN PATENT DOCUMENTS

| | | |
|---|---|---|
| JP | 62-284651 | 12/1987 |
| JP | 1-141969 | 6/1989 |
| JP | 2004-262957 | 9/2004 |
| WO | WO 2009/089137 | 7/2009 |
| WO | WO 2011/113263 | 9/2011 |

\* cited by examiner

HEAT ACTIVATED OPTICALLY CLEAR ADHESIVE FOR BONDING DISPLAY PANELS

CROSS REFERENCE TO RELATED APPLICATIONS

This application claims the benefit of U.S. Provisional Patent Application Nos. 61/311,961, filed Mar. 9, 2010 and 61/421,935, filed Dec. 10, 2010, the disclosures of which are incorporated by reference herein in their entireties.

BACKGROUND

In display assembly, bonding a touch panel or cover glass to a dimensional distortion sensitive substrate such as some liquid crystal displays (LCDs) or active matrix organic light emitting diode displays (AMOLED) by means of an optically clear adhesive can be challenging. Newer display designs are calling for thinner and lighter weight components that also have an immediate impact on the design of the actual display panel like the LCD or AMOLED. While thinner glasses that are less fragile are rapidly being adapted by the industry as thin LCD glass or a thin glass layer in an AMOLED, it is also easier to dimensionally deform or distort these thin glass layers, which can lead to unacceptable optical distortions (i.e. Mura) in the final display assembly. For example, if the LCD glass in an LCD panel is locally deformed by as little as a few microns, the actual cell gap filled with liquid crystalline material may also become non-uniform. This may result in varying optical densities that may become visible to the eye as a lighter or darker spot or band in the display. In some cases, the unevenness of the gap between the active display assembly components (i.e. LCD or AMOLED and touch panel or cover glass, or even touch panel to cover glass) can also result in optical distortion because the optical path length is no longer uniform.

Bonding a touch panel or display panel (such as a LCD panel) to a three-dimensional (3-D) cover glass by means of an optically clear adhesive can also be challenging. Indeed, newer designs use cover glasses having a thick (approaching 50 micrometers) ink step around the perimeter or frame of the cover glass, generating a substrate that is no longer flat but has a third dimension to it (i.e. the OCA has to conform to significant differences in the z-dimension of the cover lens substrate). The region encompassed by the ink step is often referred to as a gap. Some pressure sensitive adhesives (PSA), including optically clear adhesives (OCA), may not be compliant enough to conform over the ink area and thus do not completely fill the gap or completely wet the surface of the corresponding viewing area of the display.

In addition to the large ink step, other 3-D features that may require good adhesive wetting of any of the display components include things like the presence of a flex connector, slight curvature of the components, thicker ITO patterns, presence of raised integrated circuits on a touch panel and the like.

Typical PSAs are cross-linked, minimizing their ability to flow. Thus, they may be substantially incompressible, forcing the thinner glass panels to deform during and after bonding to the other display assembly components. Likewise, this lack of flow may result in uneven gaps between display panels, such as a touch panel bonded to a cover glass. In contrast, liquid optically clear adhesives (LOCAs) flow very well and could be considered very compliant in their uncured state. While LOCAs can successfully fill the gap, they may require costly dispensing equipment. LOCAs may also require careful management of the gap setting between the display assembly components (i.e. between cover glass and touch (display) panel, touch panel and LCD, cover glass and AMOLED, etc.) and may require extra cleaning processes to control adhesive overflow. In addition, curing shrinkage can lead to local stresses and deformation of distortion sensitive components, again leading to optical distortions in the display. Once cured, the LOCAs are commonly cross-linked, which can lock in any stresses or distortions generated during curing and assembly.

Mobile handheld (MHH) manufacturers and their display component makers are increasing the ink height (thickness) around the frame of cover glass and decreasing the total thickness and weight of the display to enhance the appearance and decorative features of the display device. Currently, a typical ink step is approximately 5 to 13 micrometers thick and glass components used as part of this display component can be on the order of 0.5 to 1 mm thick. Emerging display components, however, will have ink steps roughly about 50 micrometers thick or more. At the same time, MHH manufacturers would like to make the device as thin as possible, so very thick optically clear adhesive layers are typically not desirable. A conventional approach is to increase the thickness of the adhesive in order to avoid an air gap within the frame. This air gap can result from incomplete wetting of the adhesive in the gap region during initial assembly and/or it may result from excessive residual stress in the adhesive, causing it to slowly lift and detach from the substrate upon relief of the lamination pressure or during durability testing of the display. Likewise, electronic components on the glass may have thicknesses on the order of 10 to 100 μm, making wetting of these features challenging. Lenses may also be warped and curved, making the gap between the lens and the second substrate variable, often on the order of 50 to 100 μm. In some cases, the lenses may intentionally be fabricated with a controlled curvature, creating a gap between the lens and for example, the LCD which is no longer uniform, but in essence has a 3-D feature to it.

Emerging display components also utilize glass layers that are less than 0.5 mm thick. These thin glass layers are more readily deformable and the choice of optical adhesives and the type of assembly process used to put the different layers together becomes very critical. For example, high modulus and highly elastic adhesives may be laminated to a readily distortable or fragile glass panel, possibly causing the glass to become less planar or to fracture. In the case of an AMOLED display panel, even a very small fracture of the glass compromises the barrier properties that are essential for the device to operate. In the case of an LCD, a local loss in planarity of the glass can cause the liquid crystal filled cell gap to change. For example, if the optically clear adhesive cannot relieve the lamination stress quickly or it cannot properly accommodate the difference in thickness between an LCD and for example, a thick ink border printed cover lens, the easy to deform LCD glass may show a local waviness on the order of several microns. To have an optical display assembly that is free of distortion, the planarity of the glass components and uniformity of the gap between panels (for example touch glass to cover lens) should ideally be maintained within about 5 microns or less and particularly 2 microns or less. This planarity or gap uniformity becomes most critical if the micronsize variation happens within a short distance, such as a few centimeters or less.

U.S. Patent Application Publication No. US2009/0029100A1 describes a method for producing optical grade lamination of two rigid substrates using tacky hot melt adhesive films. The substrates described are flat and are not three-dimensional. In addition, the process requires an excess of heat activated material to be used so it can be squeezed out from between the substrates and take the trapped air bubbles with it. The method also requires that non-uniform pressure be applied during the application to allow for bubbles to be removed. The use of excess material and application of non-uniform pressure may make assembly with distortion sensitive or fragile substrates challenging.

SUMMARY

In one aspect, the present disclosure relates to a method of making a display assembly comprising the steps of: (a) attaching a first substrate and a second substrate with an optically clear heat activated adhesive to form a laminate, wherein each of the first and second substrates has opposing major surfaces, wherein at least one of the first and second substrates has a three dimensional surface topography covering at least a portion of one of its major surfaces or is sensitive to dimensional distortion in its viewing area; wherein at a heat activation temperature, the adhesive is pressure sensitive; and (b) heating the laminate to the heat activation temperature of the adhesive, causing the adhesive to flow, wherein the activation temperature is greater than 40° C. and less than 120° C. and particularly greater than 40° C. and less than 80° C. The adhesive is selected from thermally reversible cross-linkable adhesives and adhesives that are capable of being post-cross-linked using irradiation, thermal curing or moisture curing. After heating the laminate, the adhesive covers at least a portion of the surface topography or distortion sensitive substrate.

In another aspect, the present disclosure relates to a method of making a display assembly comprising the steps of: (a) attaching a first substrate and a second substrate with an optically clear heat activated adhesive to form a laminate, wherein each of the first and second substrates has opposing major surfaces, wherein gap uniformity between the first and second substrates is 5 microns or less in its viewing area; wherein at a heat activation temperature, the adhesive is pressure sensitive; and (b) heating the laminate to the heat activation temperature of the adhesive, causing the adhesive to flow, wherein the activation temperature is greater than 40° C. and less than 120° C. and particularly greater than 40° C. and less than 80° C. The adhesive is selected from thermally reversible cross-linkable adhesives and adhesives that are capable of being post cross-linked using irradiation, thermal curing or moisture curing. After heating the laminate, the adhesive covers at least a portion of the gap between two substrates.

DETAILED DESCRIPTION

Figure 1:
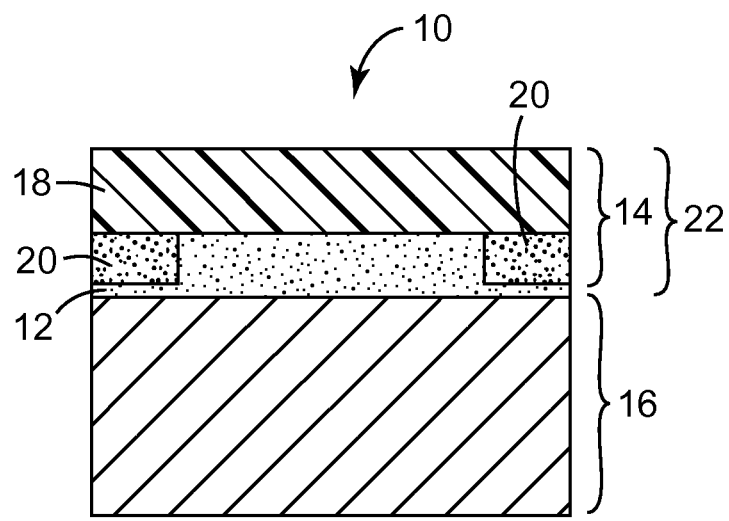
FIG. 1 is a cross-sectional view of an embodiment of an image display device including a HOCA of the present invention.

All numbers are herein assumed to be modified by the term "about." The recitation of numerical ranges by endpoints includes all numbers subsumed within that range (e.g., 1 to 5 includes 1, 1.5, 2, 2.75, 3, 3.80, 4, and 5). All parts recited herein are by weight unless otherwise indicated.

The present invention includes a heat activated optically clear adhesive (HOCA) that can conform to a 3-dimensional (3-D) feature such as a step or bump on the surface of a substrate to provide a substantially defect-free and stress-free lamination. In addition, the HOCA can effectively reduce deformation and stress of a laminate if the substrate is sensitive to deformation or stress induced by processing. This is applicable to surfaces that are both flat and topographically 3-D. The assemblies of substantially defect-free, stress-free and dimensionally distortion-free laminates are accomplished by applying heat and/or pressure before the HOCA is cross-linked. A laminate is defined as including at least a first substrate, a second substrate, and a HOCA positioned between the first and second substrates.

A beneficial product attribute of the HOCA includes its ability to flow and fill gaps between display components without causing any large dimensional distortion that can lead to optical distortion (i.e. Mura) or breakage of fragile components, yet maintain excellent mechanical and optical properties during various reliability tests after manufacturing. Another advantageous product attribute of the HOCA is its ability to avoid, or significantly reduce, the residual stress in the bond line due to the introduction of a 3-D feature that penetrates the optically clear adhesive, to the assembly process itself or to the OCA assisted bonding between display components. 3-D features can otherwise cause dimensional distortion of one or more of the substrates or non-uniform gap filling, resulting in optical distortions or breakage. The HOCA is capable of filling non-uniform gaps between a 3-D substrate, such as for example, a curved lens, and a second substrate, such as for example, an LCD module. Finally, due to the flowability of the HOCA during the assembly process, it is also possible to align the substrates prior to cross-linking the HOCA, further enhancing durability of the assembly once the substrates are bonded. This may be very advantageous in assemblies where alignment is critical, such as in displays requiring careful alignment of a distortion-sensitive 3-D lens, used for 3-D imaging displays, such as in 3-D televisions.

The present disclosure provides a heat activated optically clear adhesive for applications where high ink steps (greater than the conventional 5 to 13 micrometer height and approaching about 50 micrometers or higher) are used or where dimensional distortion of a substrate and uniformity of the gap between display components needs to be maintained below 5 microns, and particularly below 2 microns. The HOCA disclosed herein can be described as being technically positioned between a liquid optically clear adhesive and a fully cured and cross-linked optically clear pressure sensitive adhesive film or sheet. The HOCA has the form of an optically clear pressure sensitive adhesive film or sheet but behaves more like a liquid when exposed to higher temperatures (e.g., about 60° C. to 80° C.). In other words, at room temperature the HOCA will retain its shape as a sheet or film, but once exposed to higher temperatures it can flow to more uniformly fill a gap without causing any dimensional distortion of a sensitive substrate. It is these unique characteristics that makes it suitable for bonding touch glass to 3-D cover glass, LCD to 3-D cover glass, LCD to dimensional distortion sensitive substrate or cover glass to dimensional distortion sensitive substrate (i.e. flat to flat).

Heat activated optically clear adhesives have the ability to flow and fill gaps between display components, including a 3-D structure of emerging cover glasses. HOCAs can also be laminated using conventional optically clear pressure sensitive adhesive film methods with minor modifications. At room temperature the HOCA has the shape and dimensional stability of a fully cured optically clear adhesive film and can be die cut and laminated as a dry film. With very moderate heat and/or pressure, the HOCA will flow to completely wet out a substrate without creating excessive force on the substrate that may cause it to dimensionally deform, and any remaining stresses in the adhesive can be relaxed prior to the part being finished. As a result, any dimensional distortion of the substrate and any non-uniformity of the gap filled with the optically clear adhesive can be maintained below 5 microns in the z-direction within a distance of a few centimeters or less in the x-y plane. In other words, if the distortion or gap fill uniformity was considered as a wave, the amplitude of that wave would be 5 microns or less with a wavelength on the order of a few centimeters or less. The HOCA can keep the amplitude of the waviness below 5 microns over longer wavelengths, but in practice this was found to be less critical. If so desired, once the HOCA has the chance to wet the substrate, an additional covalent cross-linking step can be used to "set" the adhesive. Examples of such a cross-linking step include, but are not limited to: radiation induced cross-linking (UV, e-beam, gamma irradiation, etc.), thermal curing and moisture curing. Alternatively, the adhesive may be self-cross-linking upon cooling using thermo-reversible cross-linking mechanisms such as ionomeric cross-linking or physical cross-linking due to phase separation of higher glass transition ($T_g$) segments, such as those found in graft copolymers or block copolymers. Crystallization may also be used to enhance cohesiveness of the adhesive, but care has to be taken to avoid increased haziness in the adhesive due to light scattering resulting from larger crystalline domains. If diffuse properties are acceptable in the bonding adhesive, this precaution may no longer be needed.

In this disclosure, a material, such as an adhesive, a substrate, or a layer, is optically clear if it exhibits an optical transmission of at least about 90% and a haze value of below about 5% or lower, as measured on a 25 micrometer thick sample in the manner described below in the Examples section. In some embodiments, the adhesive may also have a higher haze (i.e., higher than about 5%), such as for example in those cases where a diffuse adhesive is required for the assembly where at least one 3-D feature or dimensionally distortion sensitive substrate needs to be wetted by the heat-activated adhesive.

In one exemplary application, the articles and the method of making the articles described in the present disclosure can be integrated into electronic devices such as, but not limited to: TV LCD panels, cell phones, hand held gaming devices, navigation systems, tablet PCs, and laptop computers.

While a single layer of HOCA may be used, a combination of a HOCA with another layer may also be applied. For example, the HOCA may be coated or laminated against another optically clear adhesive (OCA), such as a cross-linked optically clear film adhesive to make a composite HOCA/OCA construction. In a composite construction, the HOCA can flow and fill a 3-D space or avoid distortions, while the OCA provides additional gap filling height to help eliminate squeeze-out during lamination.

In another embodiment, a combination of an optically clear backing with an OCA is used to make a composite double coated tape construction (one side of the film backing is a HOCA, the other side is a standard OCA). The backing may be optically clear polyester, for example, but it may also be a stretchable carrier film as described in applicant's co-pending patent applications 61/184,213 and PCT/US2009/030084 (corresponding to PCT International Pub. No. WO 2009/089137).

In another embodiment, a double coated construction of HOCA/optically clear film/HOCA may also be used. Other multilayer constructions include HOCA/OCA/HOCA or OCA/HOCA/OCA multilayer constructions.

In order to minimize the total thickness of a display, a single layer HOCA having a thickness of 175 micrometers or less is preferred. In general, the thickness of the HOCA is equal to or higher than the maximum height of any 3-D feature the HOCA needs to comply to. Ideally, the HOCA thickness is slightly higher than the maximum height of the 3-D feature, or cavity caused by the 3-D feature. However, a difference in thickness of a few micrometers may be sufficient. In order to minimize overflow and squeeze-out, the volume of HOCA being used is typically less than 20% excess of the volume of the cavity to be filled and particularly less than 10% excess of the volume of the cavity. In some cases, less than 2%, particularly less than 1% and more particularly less than 0.5% excess volume is required, such as for example lamination against distortion sensitive substrates which are essentially flat (i.e. no significant 3-D feature is present on the substrate, such as metal trace or flexible connector). If desired, higher amounts of HOCA can be used but this needs to be balanced against process capabilities during lamination.

In multi-layer constructions, the HOCA layer thickness follows the same guidelines as the single HOCA layer, i.e., the HOCA thickness is equal to or slightly higher than the height of the 3-D feature or cavity it needs to comply to and the HOCA is not fully cross-linked during lamination to the 3-D substrate. In addition, the HOCA layer thickness needs to be sufficient to prevent the dimensional distortion or non-uniformity in the gap. Typically, a minimum thickness of about 10 microns is required for the HOCA layer in a multi-layer construction. The thermo-reversible cross-linking of polymers like graft and block copolymers allows for the HOCA to be cross-linked once returned to room temperature. Once laminated, the different types of HOCA may be covalently cross-linked to the necessary cross-link density to allow the display construction to pass durability testing required by the industry.

Adhesive Selection and Processing:

A number of different HOCAs can be used in this invention. In some embodiments, they have pressure-sensitive adhesive properties. True heat activated adhesives (i.e., ones that have very low or no room temperature tack) may also be used provided they are optically clear and have a sufficiently high melting point or glass transition temperature so as to be durable for display applications. Because most display assemblies are heat sensitive, the typical heat activation temperature (i.e., the temperature at which sufficient flow, compliance, and tack is achieved to successfully bond the display together) is below 120° C., particularly below 100° C. and more particularly below 80° C. Typically, the display fabrication process is carried out above 40° C. and at times above 60° C.

The shear storage modulus (G'), measured at a frequency of 1 Hz, of the HOCA before ultraviolet (UV) cross-linking is between $5.0 \times 10^4$ or more at 30° C. and $5.0 \times 10^4$ Pa or less at 80° C. When the shear storage modulus at 30° C. and 1 Hz is about $5.0 \times 10^4$ Pa or more, the HOCA can maintain cohesive strength necessary for processing, handling, shape keeping and the like. In addition, when the shear storage modulus at 30° C. and 1 Hz is about $3 \times 10^5$ Pa or less, initial adherence (tack) necessary for applying a HOCA can be imparted to the pressure-sensitive adhesive. When the shear storage modulus at 80° C. and 1 Hz is about $5.0 \times 10^4$ Pa or less, the HOCA can conform to a 3-D feature in a predetermined time (for example, from several seconds to several minutes) and flow to allow minimal to no formation of a gap in the vicinity thereof. In addition, excessive lamination force or autoclave pressure can be avoided, both of which can cause dimensional distortion of a sensitive substrate.

The shear storage modulus of the HOCA after UV cross-linking is about $1.0 \times 10^3$ Pa or more at 130° C. and 1 Hz. When the storage modulus at 130° C. and 1 Hz is about $1.0 \times 10^3$ Pa or more, the HOCA after ultraviolet cross-linking can be kept from flowing and adhesion with long-term reliability can be realized.

The HOCA of the present invention has the above-described viscoelastic characteristics at a stage before covalent cross-linking so that the HOCA can be made to conform to a 3-D feature on the surface of an adherend, such as a surface protective layer, by applying heat and/or pressure after laminating together the HOCA and the adherend at an ordinary working temperature. Similarly, the HOCA can be applied to a distortion sensitive surface. Thereafter, when covalent cross-linking is performed, the cohesive strength of the HOCA is raised and as a result, due to the change in viscoelastic characteristics of the HOCA, highly reliable adhesion and durability of the display assembly can be realized.

Examples of suitable HOCAs include, but are not limited to: poly(meth)acrylates and derived adhesives, thermoplastic polymers like silicone (e.g., silicone polyureas), polyesters, polyurethanes and combinations thereof. The term (meth) acrylate includes acrylate and methacrylate. Particularly suitable are (meth)acrylates because they tend to be easy to formulate and moderate in cost, and their rheology can be tuned to meet the requirements of this disclosure. In one embodiment, the HOCA is a (meth)acrylic copolymer of a monomer containing a (meth)acrylic acid ester having an ultraviolet-cross-linkable site. The term (meth)acrylic includes acrylic and methacrylic.

(Meth)acrylate adhesives can be selected from random copolymers, graft copolymers, and block copolymers. Ionomerically cross-linked adhesives, those using metal ions or those using polymers, may also be used. Examples of polymeric ionic cross-linking can be found in U.S. Pat. Nos. 6,720,387 and 6,800,680 (Stark et al.). Examples of suitable block copolymers include those disclosed in U.S. Pat. Nos. 7,255,920 (Everaerts et al.) and 7,494,708 (Everaerts et al.) and U.S. Patent Application Publication No. US2008/0011419A1.

The (meth)acrylic copolymer contained in the HOCA can perform the ultraviolet cross-linking by itself. Thus, a cross-linkable component having a low molecular weight, such as a multifunctional monomer or oligomer, need not be generally added to the HOCA.

As for the (meth)acrylic acid ester having an ultraviolet-cross-linkable site, a (meth)acrylic acid ester having, as defined above, a site capable of being activated by ultraviolet irradiation and forming a covalent link with another portion in same or different (meth)acrylic copolymer chain can be used. There are various structures acting as an ultraviolet-cross-linkable site. For example, a structure capable of being excited by ultraviolet irradiation and extracting a hydrogen radical from another portion in the (meth)acrylic copolymer molecule or from another (meth)acrylic copolymer molecule can be employed as the ultraviolet-cross-linkable site. Examples of such a structure include, but are not limited to: a benzophenone structure, a benzil structure, an o-benzoylbenzoic acid ester structure, a thioxanthone structure, a 3-keto-coumarin structure, an anthraquinone structure and a camphorquinone structure. Each of these structures can be excited by ultraviolet irradiation and in the excited state, can extract a hydrogen radical from the (meth)acrylic copolymer molecule. In this way, a radical is produced on the (meth)acrylic copolymer to cause various reactions in the system, such as formation of a cross-linked structure due to bonding of produced radicals with each other, production of a peroxide radical by a reaction with an oxygen molecule, formation of a cross-linked structure through the produced peroxide radical, and extraction of another hydrogen radical by the produced radical, causing the (meth)acrylic copolymer to finally be cross-linked.

Among the structures listed above, a benzophenone structure is advantageous due to various properties, such as transparency and reactivity. Examples of (meth)acrylic acid esters having such a benzophenone structure include, but are not limited to: 4-acryloyloxybenzophenone, 4-acryloyloxyethoxybenzophenone, 4-acryloyloxy-4'-methoxybenzophenone, 4-acryloyloxyethoxy-4'-methoxybenzophenone, 4-acryloyloxy-4'-bromobenzophenone, 4-acryloyloxyethoxy-4'-bromobenzophenone, 4-methacryloyloxybenzophenone, 4-methacryloyloxyethoxybenzophenone, 4-methacryloyloxy-4'-methoxybenzophenone, 4-methacryloyloxyethoxy-4'-methoxybenzophenone, 4-methacryloyloxy-4'-bromobenzophenone, 4-methacryloyloxyethoxy-4'-bromobenzophenone, and mixtures thereof.

The amount of (meth)acrylic acid ester having an ultraviolet-cross-linkable site is based on the total mass of monomers. In one embodiment, 0.1 mass % or more, 0.2 mass % or more or 0.3 mass % or more, and 2 mass % or less, 1 mass % or less, or 0.5 mass % or less is used. By setting the amount of the (meth)acrylic acid ester having an ultraviolet-cross-linkable site to 0.1 mass % or more based on the total mass of monomers, the adhesive strength of the HOCA after ultraviolet cross-linking can be enhanced and highly reliable adhesion and durability can be achieved. By setting the amount to 2 mass % or less, the modulus of the HOCA after ultraviolet cross-linking can be kept in an appropriate range (i.e. shear loss and storage modulus can be balanced to avoid excessive elasticity in the cross-linked adhesive).

Generally, for the purpose of imparting suitable viscoelasticity to the HOCA and ensuring good wettability to an adherend, the monomer constituting the (meth)acrylic copolymer contains a (meth)acrylic acid alkyl ester with an alkyl group having a carbon number of 2 to 26. Examples of such a (meth)acrylic acid alkyl ester include, but are not limited to, a (meth)acrylate of a non-tertiary alkyl alcohol with the alkyl group having a carbon number of 2 to 26, and mixtures thereof. Specific examples include, but are not limited to: ethyl acrylate, ethyl methacrylate, n-butyl acrylate, n-butyl methacrylate, isobutyl acrylate, isobutyl methacrylate, hexyl acrylate, hexyl methacrylate, 2-ethylhexyl acrylate, 2-ethylhexyl methacrylate, isoamyl acrylate, isooctyl acrylate, isononyl acrylate, decyl acrylate, isodecyl acrylate, isodecyl methacrylate, lauryl acrylate, lauryl methacrylate, tridecyl acrylate, tridecyl methacrylate, tetradecyl acrylate, tetradecyl methacrylate, hexadecyl acrylate, hexadecyl methacrylate, stearyl acrylate, stearyl methacrylate, isostearyl acrylate, isostearyl methacrylate, eicosanyl acrylate, eicosanyl methacrylate, hexacosanyl acrylate, hexacosanyl methacrylate, 2-methylbutyl acrylate, 4-methyl-2-pentyl acrylate, 4-tert-butylcyclohexyl methacrylate, cyclohexyl methacrylate, isobornyl acrylate, and mixtures thereof. Above all, ethyl acrylate, n-butyl acrylate, 2-ethylhexyl acrylate, isooctyl acrylate, lauryl acrylate, isostearyl acrylate, isobornyl acrylate, or mixtures thereof are suitably used.

The amount of (meth)acrylic acid alkyl ester with an alkyl group having a carbon number of 2 to 26 is based on the total mass of monomers. In one embodiment, 60 mass % or more, 70 mass % or more or 80 mass % or more, and 95 mass % or less, 92 mass % or less or 90 mass % or less is used. By setting the amount of the (meth)acrylic acid alkyl ester with an alkyl group having a carbon number of 2 to 26 to 95 mass % or less based on the total mass of monomers, the adhesive strength of the HOCA can be sufficiently ensured, whereas by setting the amount to 60 mass % or more, the modulus of the pressure-sensitive adhesive sheet can be kept in an appropriate range and the HOCA can have good wettability to an adherend.

A hydrophilic monomer may be contained in the monomer constituting the (meth)acrylic copolymer. By using a hydrophilic monomer, the adhesive strength of the HOCA can be enhanced and/or hydrophilicity can be imparted to the HOCA. In the case where the HOCA imparted with hydrophilicity is used, for example, in an image display device, because the pressure-sensitive adhesive sheet can absorb water vapor inside of the image display device, whitening due to dew condensation of such water vapor can be suppressed. This is advantageous particularly when the surface protective layer is a low moisture permeable material such as a glass plate or inorganic deposited film and/or when the image display device or the like using the pressure-sensitive adhesive sheet is used in a high-temperature high-humidity environment.

Examples of suitable hydrophilic monomers include, but are not limited to: an ethylenically unsaturated monomer having an acidic group such as carboxylic acid and sulfonic acid, a vinylamide, an N-vinyl lactam, a (meth)acrylamide and mixtures thereof. Specific examples thereof include, but are not limited to: acrylic acid, methacrylic acid, itaconic acid, maleic acid, styrenesulfonic acid, N-vinylpyrrolidone, N-vinylcaprolactam, N,N-dimethyl(meth)acrylamide, N,N-diethyl(meth)acrylamide, (meth)acrylonitrile and mixtures thereof.

From the standpoint of adjusting the modulus of the (meth)acrylic copolymer and ensuring wettability to an adherend, a (meth)acrylic acid hydroxyalkyl ester with the alkyl group having a carbon number of 4 or less, a (meth)acrylate containing an oxyethylene group, an oxypropylene group, an oxybutylene group or a group formed by connecting a combination of a plurality of these groups, a (meth)acrylate having a carbonyl group in the alcohol residue, and mixtures thereof may also be used as the hydrophilic monomer. Specific examples thereof include, but are not limited to: 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, and a (meth)acrylate represented by the formula:

$$CH_2=C(R)COO\text{-}(AO)_p\text{—}(BO)_q\text{—}R' \qquad (1)$$

(wherein each A is independently a group selected from the group consisting of $(CH_2)_rCO$, $CH_2CH_2$, $CH_2CH(CH_3)$ and $CH_2CH_2CH_2CH_2$, each B is independently a group selected from the group consisting of $(CH_2)_rCO$, $CO(CH_2)_r$, $CH_2CH_2$, $CH_2CH(CH_3)$ and $CH_2CH_2CH_2CH_2$, R is hydrogen or $CH_3$, R' is hydrogen or a substituted or unsubstituted alkyl group or aryl group, and each of p, q and r is an integer of 1 or more).

In formula (1), A is particularly $CH_2CH_2$ or $CH_2CH(CH_3)$ in view of easy availability in industry and control of moisture permeability of the obtained pressure-sensitive adhesive sheet. B is particularly $CH_2CH_2$ or $CH_2CH(CH_3)$ in view of, similarly to A, easy availability in industry and control of moisture permeability of the obtained pressure-sensitive adhesive sheet. In the case where R' is an alkyl group, the alkyl group may be any of linear, branched or cyclic. In one embodiment, an alkyl group having a carbon number of from 1 to 12 or from 1 to 8 (specifically, methyl group, ethyl group, butyl group or octyl group) and exhibiting excellent compatibility with the (meth)acrylic acid alkyl ester with the alkyl group having a carbon number of 2 to 12 is used as R'. The numbers of p, q and r are not particularly limited in their upper limits, but when p is 10 or less, q is 10 or less and r is 5 or less, compatibility with the (meth)acrylic acid alkyl ester with the alkyl group having a carbon number of 2 to 12 can be more enhanced.

A hydrophilic monomer having a basic group such as an amino group may also be used. Blending of a (meth)acrylic copolymer obtained from a monomer containing a hydrophilic monomer having a basic group with a (meth)acrylic copolymer obtained from a monomer containing a hydrophilic monomer having an acid group may increase the viscosity of the coating solution and thereby increase the coating thickness, controlling the adhesive strength, etc. Furthermore, even when an ultraviolet-cross-linkable site is not contained in the (meth)acrylic copolymer obtained from a monomer containing a hydrophilic monomer having a basic group, the effects of the blending above can be obtained and such a (meth)acrylic copolymer can be cross-linked through an ultraviolet-cross-linkable site of another (meth)acrylic copolymer. Specific examples thereof include, but are not limited to: N,N-dimethylaminoethyl acrylate, N,N-dimethylaminoethyl methacrylate (DMAEMA), N,N-diethylaminoethyl methacrylate, N,N-dimethylaminoethylacrylamide, N,N-dimethylaminoethylmethacrylamide, N,N-dimethylaminopropylacrylamide, N,N-dimethylaminopropylmethacrylamide, vinylpyridine and vinylimidazole.

As for the hydrophilic monomer, one kind may be used, or a plurality of kinds may be used in combination. The term "hydrophilic monomer" is a monomer having a high affinity for water, specifically, a monomer that dissolves in an amount of 5 g or more per 100 g of water at 20° C. In the case of using a hydrophilic monomer, the amount of the hydrophilic monomer is, based on the total mass of monomers, generally from about 5 to about 40 mass % and particularly from about 10 to about 30 mass %. In the latter case, the above-described whitening can be more effectively suppressed and at the same time, high flexibility and high adhesive strength can be obtained.

Other monomers may be contained as the monomer used in the (meth)acrylic copolymer within the range not impairing the characteristics of the pressure-sensitive adhesive sheet. Examples include, but are not limited to: a (meth)acrylic monomer other than those described above, and a vinyl monomer such as vinyl acetate, vinyl propionate and styrene.

The (meth)acrylic copolymer can be formed by polymerizing the above-described monomer in the presence of a polymerization initiator. The polymerization method is not particularly limited and the monomer may be polymerized by a normal radical polymerization such as solution polymerization, emulsion polymerization, suspension polymerization and bulk polymerization. Generally, radical polymerization using a thermal polymerization initiator is employed so as to allow for no reaction of the ultraviolet-cross-linkable site. Examples of the thermal polymerization initiator include, but are not limited to: an organic peroxide such as benzoyl peroxide, tert-butyl perbenzoate, cumyl hydroperoxide, diisopropyl peroxydicarbonate, di-n-propyl peroxydicarbonate, di(2-ethoxyethyl)peroxydicarbonate, tert-butyl peroxyneodecanoate, tert-butyl peroxypivalate, (3,5,5-trimethylhexanoyl)peroxide, dipropionyl peroxide and diacetyl peroxide; and an azo-based compound such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile) and 2,2'-azobis[2-(2-imidazolin-2-yl)propane]. The average molecular weight of the obtained (meth)acrylic copolymer is generally 30,000 or more, 50,000 or more, or 100,000 or more, and 1,000,000 or less, 500,000 or less, or 300,000 or less. If the glass transition temperature is higher, the adhesive is no longer tacky at room temperature but it may still be used as a heat-activatable adhesive provided it can be activated to bond to the substrates within the temperature ranges specified above.

The HOCA may further contain diphenyl(2,4,6-trimethylbenzoyl)phosphine oxide (TPO) as a photoinitiator, rather than the above-described (meth)acryl copolymer. By adding TPO to the HOCA, the ultraviolet irradiation dose necessary for ultraviolet cross-linking can be decreased. As a result, for example, shortening of tact time (time to bond the substrates together to allow for handling) or energy saving becomes possible and the process of laminating the adherend can be more efficient. Addition of TPO is advantageous particularly when the adherend contains an ultraviolet absorber and an ultraviolet ray is irradiated on the pressure-sensitive adhesive sheet through the adherend.

The HOCA may contain additional components such as filler and antioxidant, other than the above-described (meth)acrylic copolymer. However, the (meth)acrylic copolymer itself has properties necessary for use as a HOCA, and therefore when the additional components are not added, this is advantageous in that contamination by the bleed-out of the components other than the (meth)acrylic copolymer or change in characteristics of the HOCA is not caused.

The storage modulus of the pressure-sensitive adhesive sheet can be adjusted by appropriately varying the kind, molecular weight and blending ratio of monomers constituting the (meth)acrylic copolymer contained in the pressure-sensitive adhesive sheet and the polymerization degree of the (meth)acrylic copolymer. For example, the storage modulus rises when an ethylenically unsaturated monomer having an acidic group is used, and the storage modulus lowers when the amount of the (meth)acrylic acid alkyl ester with the alkyl group having a carbon number of 2 to 26, the (meth)acrylic acid hydroxyalkyl ester with the alkyl group having a carbon number of 4 or less, the (meth)acrylate containing an oxyethylene group, an oxypropylene group, an oxybutylene group or a group formed by connecting a combination of a plurality of these groups, or the (meth)acrylate having a carbonyl group in the alcohol residue is increased. When the polymerization degree of the (meth)acrylic copolymer is increased, the storage modulus tends to rise at elevated temperatures (i.e. the rubbery plateau modulus becomes extended towards higher temperatures).

Blends of these polymers may also be used, such as for example block copolymers and random copolymers, or ionomerically cross-linked polymers and graft copolymers. Likewise, polymers may combine cross-linking methods such as ionomeric and physical cross-linking due to high Tg grafts or blocks in the polymer. Optionally, these polymers may be formulated with optically clear tackifiers and plasticizers that yield an optically clear adhesive composition. In the case of graft and block copolymers that are physically cross-linked, no additional cross-linking agents may be required. However, like for random copolymers that are not physically cross-linked, additional cross-linkers may be incorporated into the adhesive formulation. Examples of these may include, but are not limited to: hydrogen abstraction type cross-linkers (for example benzophenone and its derivatives) that are activated with UV light, silanes that can moisture cure, and combinations of multifunctional acrylates and photoinitiators.

The thickness of the HOCA can be selected according to the usage and may be, for example, from 5 µm to about 1 mm. One of the bases for determining the thickness of the HOCA is the height of a 3-D feature present on the adherend surface. As described above, the thickness of the HOCA can be reduced to substantially the same level as the height of the 3-D feature. In one embodiment where the adherend is substantially planar when the height of a 3-D feature on the adherend surface is determined along the direction perpendicular to the spread-out planar surface of the HOCA applied to the adherend (the thickness direction of the HOCA), the thickness of the HOCA can be made to be 0.8 times or more, 1 times or more, or 1.2 times or more, and 5 times or less, 3 times or less, or 2 times or less, the maximum height of the 3-D feature. By providing the HOCA with such a thickness, the thickness of a laminate including an adherend can be kept small and, for example, reduce the size and thickness of an image display device or enhance the sensitivity of a touch panel.

The adhesives may be dissolved in solvents but this generally limits the final adhesive thickness to 75 microns or less, more typically 50 microns or less. At higher coating thicknesses, the drying step often introduces undesirable bubbles in the adhesive layer. Thus, any 3-D feature that is higher than 75 microns cannot be covered with these thin adhesive layers. One way to get to heavier thicknesses is to laminate at least two of these solvent cast adhesive layers together, but a more preferred way is to hot-melt process the adhesive of this invention. Hot-melt coating can be done using a die connected to a melting device, such as a pail or drum unloader, a grid melter, and the like. Alternatively, an extruder may be used to feed the die with the heat activated adhesive. Yet another process that may be used is the calendaring technique. If desired, the HOCA can also be pressed to the desired thickness prior to the lamination step. In each of these cases, the heat activated adhesive is coated on at least one release liner and in most cases between two release liners.

Heat activation of the adhesive often requires moderate temperatures to avoid damage to the display components. Likewise, most of the heat activated adhesive applications expose at least part of the material to the viewing area of the display, making optical clarity a necessity. In addition, excessive stiffness of the adhesive or resistance to flow at the temperature of the assembly process may cause excessive stress to build up, leading to mechanical damage or dimensional distortion of the components or optical distortions in the display. Thus it is desirable that the rubbery plateau shear storage modulus (G') of the adhesive at the process temperature is below $10^5$ Pascals and particularly less than $10^4$ Pascals. In addition, adhesives with low melt elasticity are preferred, favoring polymers with lower molecular weight. Typical polymers will have a weight average molecular weight of 700,000 or less and particularly 500,000 or less. Because of this, lower molecular weight acrylic hot melt adhesives, such as those described in U.S. Pat. Nos. 5,637,646 (Ellis); 6,806,320 (Everaerts et al.) and 7,255,920 (Everaerts) are desired.

The HOCA can be formed from the (meth)acrylic copolymer alone or a mixture of the (meth)acrylic copolymer and optional components (TPO and other additional components) by using a conventional method such as solvent casting and extrusion processing. The pressure-sensitive adhesive sheet may have on one or both surfaces a release film such as silicone-treated polyester film or polyethylene film.

A method of making a display assembly using a HOCA includes attaching a first substrate and a second substrate with an optically clear heat activated adhesive to form a laminate and heating the laminate to the heat activation temperature of the adhesive, causing the adhesive to flow. At the heat activation temperature, the adhesive is pressure sensitive. The adhesive is a thermally reversible cross-linkable adhesive or an adhesive that is capable of being post cross-linked using irradiation, thermal or moisture curing. At least one of the first and second substrates has a three-dimensional surface topography covering at least a portion of one of its major surfaces or is distortion sensitive.

In one embodiment, a laminate includes a first substrate having a 3-D feature on at least one surface, a second substrate and the above-described HOCA disposed between the first substrate and the second substrate. At least one surface of the first substrate is in contact with the HOCA. In this laminate, the HOCA is in contact with the first substrate surface having a 3-D feature and conforms to the 3-D feature and, therefore the vicinity of the 3-D feature is filled with the HOCA, allowing no formation of a gap near the 3-D feature.

Such a laminate can be produced by a method including disposing the ultraviolet-cross-linkable pressure-sensitive adhesive sheet to adjoin the first substrate on the 3-D feature containing surface side; disposing the second substrate to adjoin the HOCA; heating and/or pressurizing the HOCA to conform to the 3-D feature; and irradiating an ultraviolet ray on the HOCA. These steps can be performed in various orders.

A laminate including a distortion sensitive substrate can be similarly produced. A laminate can be produced by a method including disposing the ultraviolet-cross-linkable pressure-sensitive adhesive sheet to adjoin the distortion sensitive substrate; disposing the second substrate to adjoin the HOCA; heating and/or pressurizing the HOCA; and irradiating an ultraviolet ray on the HOCA. These steps can be performed in various orders.

In one embodiment, first, the HOCA is disposed to adjoin the first substrate on the 3-D feature-containing surface side, and the second substrate is disposed to adjoin the HOCA. In other words, the HOCA is sandwiched between the first substrate and the second substrate such that the surface having the 3-D feature faces the HOCA. Next, the HOCA is heated and/or pressurized, thereby allowing the HOCA to conform to the 3-D feature. Thereafter, an ultraviolet ray is irradiated from the first substrate side and/or the second substrate side on the HOCA through the substrate to cross-link the HOCA. In this way, the first substrate and the second substrate can be adhered without forming a gap in the vicinity of the 3-D feature of the first substrate. In this embodiment, the HOCA is heated and/or pressurized after disposing the first substrate and the second substrate to adjoin the HOCA, so that when a 3-D feature is present on the second substrate surface to be adhered, for example, when the HOCA is applied on a polarizing plate attached to an image display module, the HOCA can conform to the 3-D feature of the second substrate and formation of a gap can be prevented also in the vicinity of such a 3-D feature. This method is also applicable to a substrate having a distortion sensitive surface.

In the embodiment above, at least one of the first substrate and the second substrate is at least partially transparent so that an ultraviolet ray necessary for the cross-linking of the HOCA can be irradiated through the substrate. In the case where the 3-D feature of the first substrate does not transmit an ultraviolet ray, an ultraviolet ray when irradiated from the first substrate side is not irradiated beneath the 3-D feature, but due to movement or the like of a radical generated in the irradiated portion, cross-linking of the HOCA proceeds also in the non-irradiated portion to some extent. In such a case, when the second substrate is a transparent substrate such as touch panel, an ultraviolet ray can be irradiated from the second substrate side, whereby an ultraviolet ray can also be irradiated on the HOCA in the portion corresponding to the 3-D feature and the HOCA can be more uniformly cross-linked.

In another embodiment, after disposing the HOCA to adjoin the first substrate on the 3-D feature-containing surface side, the HOCA is heated and/or pressurized, thereby allowing the HOCA to conform to the 3-D feature. Thereafter, an ultraviolet ray is irradiated on the open surface of the HOCA to cross-link the HOCA. Furthermore, the second substrate is disposed to adjoin the HOCA, and the second substrate is laminated to the HOCA. This method is also applicable to a substrate having a distortion sensitive surface. In the case where the release film is transparent, an ultraviolet can also be irradiated on the HOCA through the release film. In this embodiment, an ultraviolet ray can be irradiated on the entire surface of the HOCA so that the HOCA can be more uniformly cross-linked. When the first substrate is at least partially transparent so that an ultraviolet ray necessary for the cross-linking of the HOCA can be irradiated therethrough, an ultraviolet ray can also be irradiated from the first substrate side. In this way, the first substrate and the second substrate can be adhered without forming a gap in the vicinity of the 3-D feature of the first substrate.

The heating step can be performed using a convection oven, a hot plate, a heat laminator, an autoclave or the like. In order to promote flowing of the HOCA and allow the HOCA to more efficiently conform to a 3-D feature, it is preferred to apply a pressure simultaneously with heating by using a heat laminator, an autoclave or the like. Pressurization using an autoclave is advantageous particularly for defoaming the HOCA. The heating temperature of the HOCA may be a temperature at which the HOCA is softened or flows to sufficiently conform to a 3-D feature, and the heating temperature can be generally 30° C. or more, 40° C. or more, or 60° C. or more, and 150° C. or less, 120° C. or less, or 100° C. or less. In the case of pressurizing the HOCA, the pressure applied can be generally 0.05 MPa or more, particularly 0.1 MPa or more, and 2 MPa or less, particularly 1 MPa or less.

The ultraviolet irradiation step can be performed using a general ultraviolet irradiation apparatus, for example, a conveyer belt-type ultraviolet irradiation apparatus, where a low-pressure mercury lamp, a medium-pressure mercury lamp, a high-pressure mercury lamp, an ultrahigh-pressure mercury lamp, a xenon lamp, a metal halide lamp, an electrodeless lamp or the like is used as the light source. The ultraviolet irradiation dose is generally from about 1,000 to about 6,000 mJ/cm$^2$.

For illustrative purposes, an embodiment where the first substrate is a surface protective layer having a 3-D feature on the surface and the second substrate is a flat image display module or a touch panel is described below by referring to FIGS. 1 and 2.

The surface protective layer is disposed on the outermost surface of the image display module or touch panel and protects it from the outside. The surface protective layer is not particularly limited as long as it is a layer conventionally used as a protective material of an image display module or a touch panel. The surface protective layer may be, for example, an acrylic resin film such as polymethyl methacrylate (PMMA), a polycarbonate resin film or a glass plate. The thickness of the film or glass plate is generally from about 0.1 mm to about 5 mm, but is not limited thereto.

The surface protective layer on the observer side of the image display module or on the user side of the touch panel may be provided with a layer for imparting a function or a property, such as abrasion resistance, scratch resistance, antifouling property, antireflection and antistatic property. The layer for imparting abrasion resistance and scratch resistance can be formed by coating and curing a curable resin composition capable of forming a hardcoat. For example, a coating material composed of a partial condensation reaction product of a silane mixture containing an alkyltrialkoxysilane as the main component and colloidal silica may be coated and then cured by heating to form a cured film, or a coating material containing a multifunctional acrylate as the main component may be coated and the coating may be irradiated with an ultraviolet ray to form a cured film. For ensuring the antifouling property, a resin layer containing an organic silicon compound or a fluorine-based compound may be formed. Furthermore, for obtaining the antistatic property, a resin layer containing a surfactant or an electrically conductive fine particle may be formed. The layer for imparting such a function or a property is preferably a layer not inhibiting the transparency of the surface protective layer, and is preferably as thin as possible without losing the function. The thickness of the layer for imparting a function or a property is generally from about 0.05 μm to about 10 μm, but is not limited thereto.

In the embodiment described here, an additional layer such as a printing layer or a deposition layer is imparted to a partial region of the surface adjoining the HOCA, of the surface protective layer, and a 3-D feature is formed on the surface of the surface protective layer. The printing layer or deposition layer is formed in a frame shape, for example, in the outer peripheral part of an image display module and functions as a light-shielding layer to hide the portion from view. The thickness of the printing layer or deposition layer used as such a light-shielding layer is generally from about 10 μm to about 20 μm for a black color having a high light-shielding effect and from about 40 μm to about 50 μm for a light-transmittable color such as white.

Examples of the image display module include, but are not limited to, an image display module for reflection-type or backlight-type liquid crystal display units, AMOLED, plasma display units, electroluminescence (EL) displays and electronic paper. On the display surface of the image display module, an additional layer (which may be either one layer or multiple layers) such as a polarizing plate (which sometimes has an uneven surface) can be provided. Also, the later-described touch panel may be present on the display surface of the image display module.

A touch panel is a transparent thin film-shaped device and when a user touches or presses a position on the touch panel with a finger or a pen, the position can be detected and specified. Examples of the general position detecting system include a resistance film system operating with a pressure applied to the touch panel and a capacitance system detecting the change in capacitance between a finger tip and the touch panel. The touch panel is mounted on an image display device such as CRT display or liquid crystal display and used in ATM, PC (personal computer), and portable terminals such as cellular phone and PDA.

FIG. 1 illustrates a cross-sectional view of one embodiment of the image display device including a HOCA. Image display device 10 has a structure where HOCA 12 and surface protective layer 14 are stacked in this order on the display surface of image display module 16. Surface protective layer 14 is composed of continuous layer 18 and light-shielding layer 20 provided in a partial region of the undersurface (on the side of pressure-sensitive adhesive sheet) of continuous layer 18, and a 3-D feature is formed on the surface. Incidentally, light-shielding layer 20 is formed by mixing a colorant in a coating solution comprising a curable resin composition, coating the resulting solution on a predetermined region of continuous layer 18 by an appropriate method such as screen printing, and curing the coating by an appropriate curing method such as ultraviolet irradiation. HOCA 12 is applied on the 3-D feature-containing surface of surface protective layer 14. HOCA 12 conforms to the 3-D feature produced by light-shielding layer 20 by applying heat and/or pressure before the ultraviolet irradiation, and therefore a gap is not generated near the 3-D feature. In addition, the internal residual stress of the HOCA 12 is relieved so that display unevenness in the image display device can be prevented. Image display device 10 is obtained, for example, by applying laminate 22 composed of surface protective layer 14 and HOCA 12 to the display surface of image display module 16.

Figure 2:
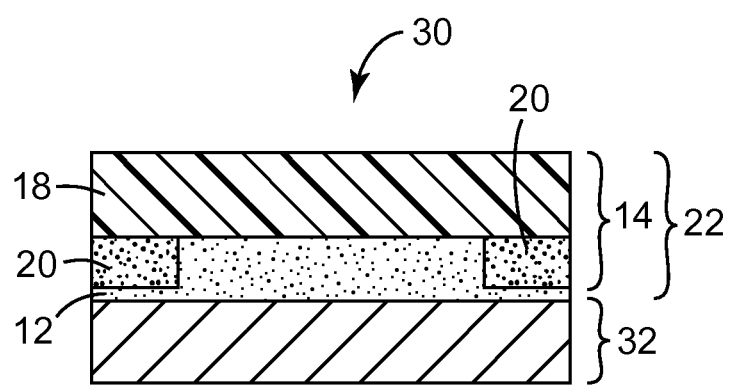
FIG. 2 is a cross-sectional view of an embodiment of a touch panel unit including a HOCA of the present invention.

FIG. 2 is a cross-sectional view of an embodiment of the touch panel unit including a HOCA. Touch panel unit 30 has a structure where HOCA 12 and surface protective layer 14 are staked in this order on touch panel 32. The structure of laminate 22 obtained by stacking HOCA 12 and surface protective layer 14 in this order is the same as that shown in FIG. 1. HOCA 12 conforms to the 3-D feature produced by light-shielding layer 20 by applying heat and/or pressure before the ultraviolet irradiation. Therefore, a gap is not generated near the 3-D feature. Touch panel unit 30 is obtained, for example, by applying laminate 22 composed of surface protective layer 14 and HOCA 12 to touch panel 32. Also, an image display module having a display surface on the topside (not shown) may be attached to the bottom side of touch panel 32 directly or through another HOCA.

In still another embodiment of this disclosure, an electronic device containing the above-described image display module is provided. Examples of the electronic device include, but are not limited to: a cellular phone, a personal digital assistance (PDA), a portable game machine, an electronic book terminal, a car navigation system, a portable music player, a clock, a television (TV), a video camera, a video player, a digital camera, a Global Positioning System (GPS) device and a personal computer (PC).

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

3-D Substrate Examples

Haze and Transmission Testing

A 25 micron thick sample of the OCA was laminated to a 25 micron thick Melinex® polyester film 454 (from DuPont Company, Wilmington, Del.) in a manner so as to assure that no air bubbles were trapped between the film and the adhesive layer. A 75 mm by 50 mm plain micro slide (a glass slide from Dow Corning, Midland, Mich.), that had been wiped three times with isopropanol, was laminated to the adhesive sample using a hand roller to assure no air bubbles were trapped between the adhesive and the glass slide. The percent (%) transmission and haze were measured using a Model 9970 BYK Gardner TCS Plus Spectrophotometer (from BYK Gardner, Columbia, Md.). The background measurement was made with a sandwich of the Melinex® polyester film 454 and the glass slide. The percent transmission and the haze of the adhesive sample were then obtained directly on the film/adhesive/glass laminate in the spectrophotometer.

Heat Activated Adhesive

To demonstrate the described invention, both a 90/10 (wt./wt.) isooctylacrylate/acrylic acid copolymer, designated Adhesive 1, and a 95/5 (wt./wt.) isooctylacrylate/acrylic acid copolymer, designated Adhesive 2, with low molecular weight were used. Both polymers were made using the bulk polymerization process described in U.S. Pat. No. 5,637,646 (Ellis). The inherent viscosity of Adhesive 1 was 0.51 dl/g (measured in ethyl acetate at a concentration of 0.2 dl/g and a temperature of 25° C.) and that of Adhesive 2 was about 0.45 dl/g.

A third adhesive, a UV cross-linkable adhesive, designated Adhesive 3 was also used. Adhesive 3 was prepared from the copolymerization of three monomers as follows: 87.5 parts by weight 2-ethylhexyl acrylate, 12.5 parts acrylic acid and 0.35 parts 4-acryloyloxybenzophenone were mixed together along with a 50/50 wt % solvent solution of ethyl acetate/methyl ethyl ketone, such that the total amount of monomers was 40 wt % relative to the solvent solution. A thermal initiator, 2,2'-Azobis(2.4-dimethylvaleronitrile) (available under the trade designation V-65 from Wako Pure Chemical Industries, Ltd., Osaka, Japan) was added to the monomer solution, 0.2 wt. % initiator based on the monomer content. The solution was purged with nitrogen for 10 minutes. The polymerization was carried out at 50° C. for 24 hours producing a viscous polymer solution. The molecular weight (Mw) of the resulting copolymer was measured by GPC to be 210,000 g/mol. GPC used tetrahydrofuran as solvent and employed monodisperse polystyrene standards.

Preparation of Transfer Adhesives

Adhesive films between release liners, i.e. transfer adhesives, were prepared from Adhesive 1 and Adhesive 2 in the following manner. About 25 g of Adhesive 1 was placed between two siliconized polyester release liners, a 2 mil CLEARSIL T10 "easy" release liner and a 5 mil CLEARSIL T50 "tight" release liner, both available form CPFilms, Inc., Fieldale, Va., cut to 6 inch length by 12 inch width. The adhesive and release liners were placed between two glass plates each about 300 cm in length by 190 cm in width by 3.5 mm in thickness forming a layered structure. The layered structure was placed between the platens of a Carver press (model number 2699 available from Carver, Inc. Wabash, Ind.). The platens were heated to about 180° F. (82° C.) and very slight pressure was applied to the layered structure. After about 5 minutes, the press was opened and layered structure was removed from the press and allowed to cool. The adhesive with attached release liners was removed from the layered structure forming Transfer Adhesive 1. Using 25 g of Adhesive 2, Transfer Adhesive 2 was formed using the same procedure. The above pressing procedure produced transfer adhesives having a smooth surface finish with a thickness in the range of 60-100 µm.

Transfer Adhesive 3 was prepared from Adhesive 3. Adhesive 3 was coated on the heavy release side of a 50 µm thick PET release liner (available under the trade designation Cerapeel MIB(T), from Toray Advanced Film Co., Ltd., Tokyo, Japan) using a knife coater. The gap of the coater was set at 100 µm. After coating, the adhesive film was dried at 100° C. for 8 minutes to remove solvent. The dried adhesive thickness was about 25 µm. Another release liner, a 38 µm thick liner (available under the trade designation PUREX A-31, Teijin DuPont Films, Japan Ltd., Tokyo, Japan) was laminated to the exposed surface of Adhesive 3, producing Transfer Adhesive 3.

Example 1

A pair of transfer adhesives was used to laminate a 0.5 mm thick glass panel to a 1 mm thick cover lens having a printed ink border, i.e., an ink step, about 40 µm thick. The ink border encompassed the entire perimeter of the cover lens. One transfer adhesive was Transfer Adhesive 1 and the other was an optically clear pressure sensitive transfer adhesive available under the trade designation "3M Optically Clear Adhesive 8186" from 3M Company, St. Paul, Minn. A sheet of the 3M Optically Clear Adhesive 8186, about 150 microns thick, was cut to the length and width dimensions of the glass panel. The "easy" release liner was removed and the adhesive was hand laminated to the glass panel using a rubber roller. A piece of Transfer Adhesive 1 was cut precisely to the size of the interior dimensions of the ink border using a razor blade such that it completely filled the cavity formed by the ink border. After removing the "easy" release liner, Adhesive 1 was carefully aligned within the ink border and hand laminated to the cover lens. The "tight" release liners were then removed from both adhesives and the glass panel and cover lens were laminated together by contacting the two adhesives together. A vacuum bonding machine, model number TPL-0209 MH available from Takatori Corporation, Kashihara City, Japan, was used for the room temperature lamination. The lamination conditions were as follows: pressure 0.5 MPa, lamination time about 5 seconds and vacuum of 30 Pa. The glass panel/cover lens laminate was then placed in an autoclave for 30 minutes at a temperature of about 60° C. and a pressure of about 7 atm. After removing from the autoclave, the glass panel/cover lens laminate had only a few bubbles, particularly in the corners of the ink border. Without the use of Transfer Adhesive 1, an 8186 transfer adhesive (only) used in the same lamination process produced significantly more bubbles around the entire perimeter of the ink step.

Similar results as those obtained with Transfer Adhesive 1 were obtained when Transfer Adhesive 2 was used in place of Transfer Adhesive 1 using the above procedure. It is believed that if Adhesive 1 is laminated to the substrate having the ink border and then heated for about 5 minutes at about 80° C. to allow the adhesive to wet the gap region and then laminate to the 8186 adhesive, the remaining bubbles would be removed.

Figure 3A:
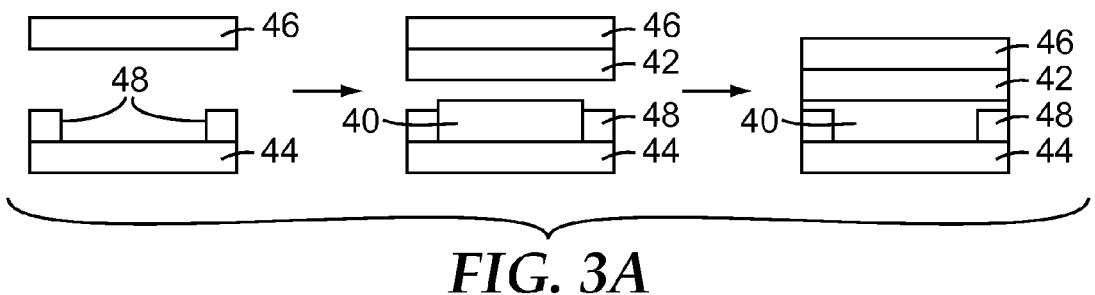
FIG. 3A is a schematic, cross-sectional view of a first method of laminating a heat-activated optically clear adhesive (HOCA) of the present invention.
Figure 3B:
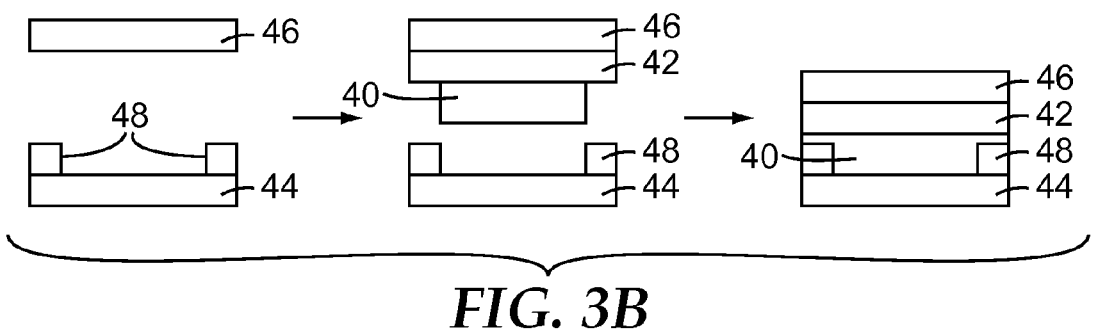
FIG. 3B is a schematic, cross-sectional view of an alternate embodiment of the first method of laminating the HOCA shown in FIG. 3A.
Figure 3C:
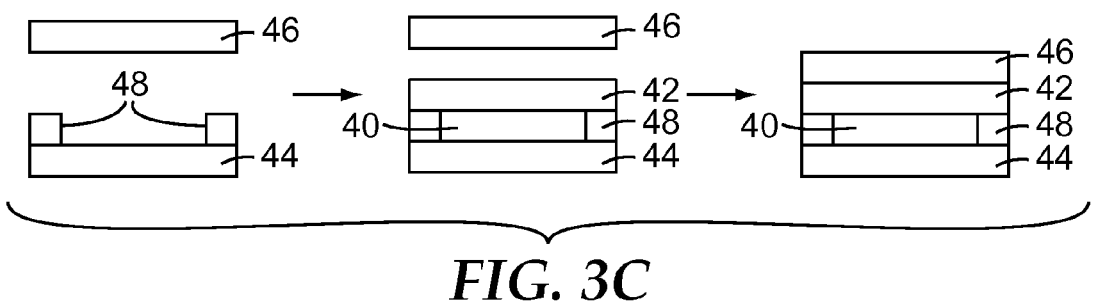
FIG. 3C is a schematic, cross-sectional view of an alternate embodiment of the first method of laminating the HOCA shown in FIG. 3A.

A schematic, cross-sectional view of the method of lamination of Example 1 is shown in FIG. 3A, along with two alternative methods, FIGS. 3B and 3C. As can be seen in FIG. 3A, a first substrate 46 is positioned over a second substrate 44 having an ink step 48. Prior to contacting the first substrate 46 to the second substrate 44, the OCA 42 is laminated to the first substrate 46 and the HOCA 40 is deposited onto the second substrate 44, filling in the gap region defined by the ink step 48.

In the embodiment of FIG. 3B, the OCA 42 is laminated to the first substrate 46 and the HOCA 40 is attached to the OCA 42 prior to laminating to second substrate 44.

In the embodiment of FIG. 3C, the HOCA 40 and OCA 42 are laminated to second substrate 44 prior to laminating to first substrate 46.

In the embodiments illustrated in FIGS. 3A and 3B, the volume of HOCA 40 is greater than the volume of the gap region defined by the ink step 48. The final structures shown in FIGS. 3A and 3B demonstrate the HOCA 40 flowing over the ink step 48. In the embodiment illustrated in FIG. 3C, the volume of HOCA 40 is about equal to the volume of the gap region defined by the ink step 48. Thus, in the final structure of FIG. 3C, the OCA 42 directly contacts the ink step 48. Optionally, the HOCA 40 could be slightly higher than the ink step 48, resulting in a final structure with HOCA 40 flowing over the ink step 48.

Example 2

Adhesive 1 was dissolved in ethyl acetate at a concentration of 45% by weight solution. The solution was coated on a 6 inch×24 inch, 5 mil CLEARSIL T50 "tight" release liner, using a 6 inch wide knife coater, forming an adhesive layer 62 µm thick. The solvent was removed by drying in an oven at 70° C. for 15 minutes. A second release liner, 2 mil CLEARSIL T10 "easy" release liner, was then hand laminated onto the exposed face of the adhesive using a rubber hand roller. Care was taken to make sure no air bubbles were trapped between the liner and the adhesive. Transfer Adhesive 1 along with a sheet of the 3M Optically Clear Adhesive 8186 were laminated together by hand after removing the "easy" release liners from both. This multi-layer adhesive was cut to the length and width dimensions of the glass panel. The "tight" release liner was removed from the 3M Optically Clear Adhesive 8186 and it was laminated by hand to the glass panel using a rubber roller. The tight release liner was then removed from Adhesive 1 of the multi-layer adhesive and the adhesive was laminated to the cover lens using the same bonding machine and process conditions as described for Example 1. The substrates were identical to those described in Example 1. The glass panel/cover lens laminate was then placed in the autoclave as described in Example 1 and processed according to the autoclave conditions of Example 1. After removing from the autoclave, the glass panel/cover lens laminate was free of bubbles and showed complete wetting of the ink step.

Figure 4A:
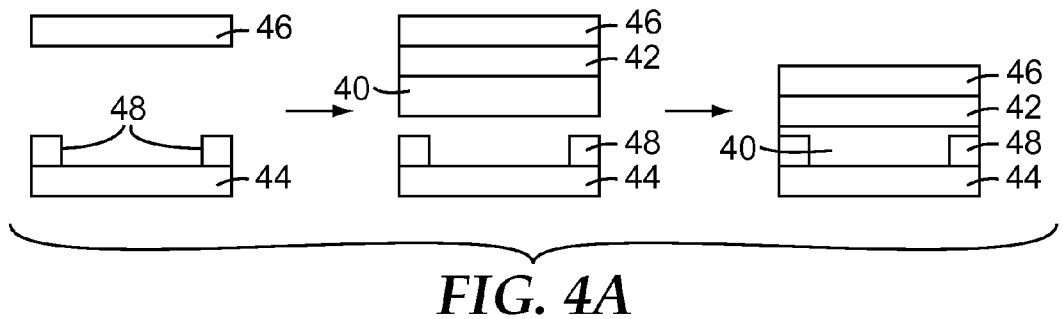
FIG. 4A is a schematic, cross-sectional view of a second method of laminating a HOCA of the present invention.
Figure 4B:
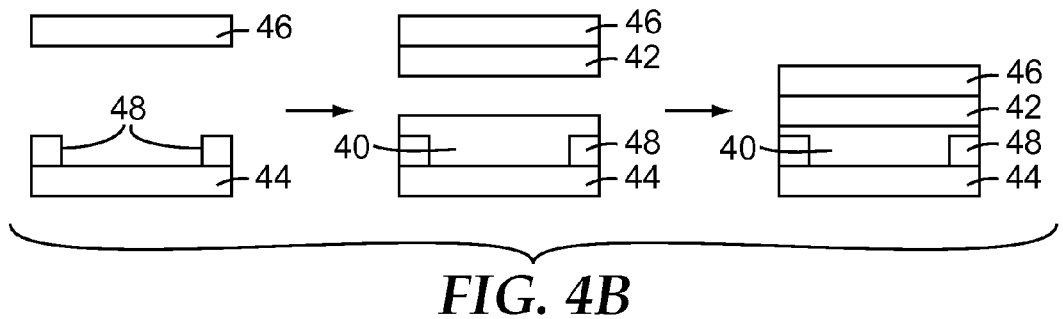
FIG. 4B is a schematic, cross-sectional view of an alternate embodiment of the second method of laminating the HOCA shown in FIG. 4A.

A schematic, cross-sectional view of the method of lamination of Example 2 is shown in FIG. 4A and an alternative method in FIG. 4B. As can be seen in FIG. 4A, the OCA 42 is attached to the first substrate 46 and the HOCA 40 is attached to the OCA 42 prior to contacting the second substrate 44.

In the embodiment shown in FIG. 4B, the OCA 42 is laminated to the first substrate 46 and the HOCA 40 is laminated within the ink step 48 of the second substrate 44 prior to contacting the first substrate 46. Upon time and/or time/temperature increase, the HOCA 40 flows to fill the gap region.

Two glass panel/cover lens laminates were prepared in this manner. The laminates were subsequently tested for durability. One laminate was placed in an air flow through oven at a set point of 85° C. for about 72 hours. The second laminate was placed in an oven at 60° C. and 90% relative humidity for 72 hours. After durability testing, both laminates remained bubble free and no air gaps formed near the ink step.

Example 3

In Example 3, a 75 µm thick single layer of HOCA was made by solvent coating Adhesive 1 following the procedure described in Example 2. The gap on the knife coater was increased to allow for the desired adhesive thickness. The 75 µm Transfer Adhesive 1 is used to bond the first substrate 46 and the second substrate 44. The lamination procedure was as follows. The "easy" release liner was removed first and the adhesive was hand laminated to the first substrate 46. The "tight" release liner was then removed and the exposed adhesive was applied to the second substrate 44, followed by vacuum lamination and autoclaving according to Example 1.

Figure 5A:
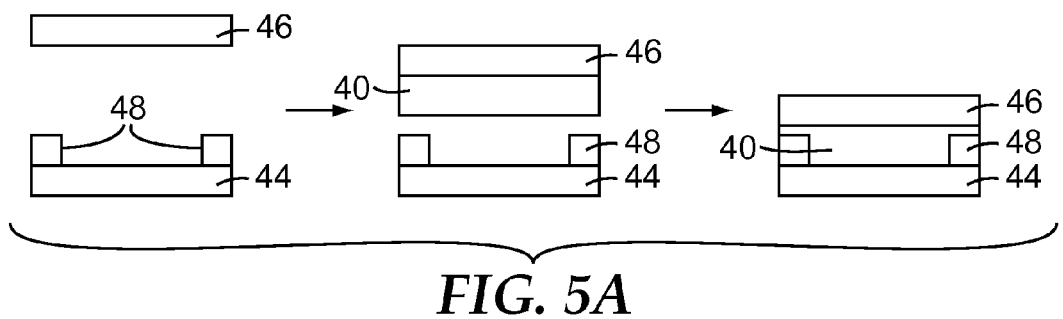
FIG. 5A is a schematic, cross-sectional view of a third method of laminating a HOCA of the present invention.
Figure 5B:
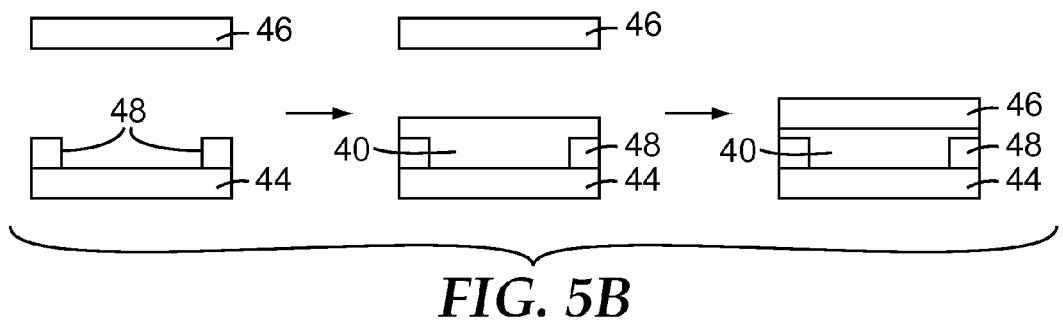
FIG. 5B is a schematic, cross-sectional view of an alternate embodiment of the third method of laminating the HOCA shown in FIG. 5A.

A schematic, cross-sectional view of the method of lamination of Example 3 is shown in FIG. 5A, along with an alternative method in FIG. 5B. As can be seen in the figures, in the embodiment shown in FIG. 5A, the HOCA 40 was laminated to the first substrate 46 prior to laminating to the second substrate 44. In the embodiment shown in FIG. 5B, the HOCA 40 was deposited within the gap region of the second substrate 44 and laminated prior to laminating to the first substrate 46.

Example 4

The lamination procedure of Example 4 was identical to that of Example 3. However, instead of an ink step on the glass panel, a step height of 50 µm was achieved by applying a 50 µm thick polyester tape to the perimeter of the glass panel. A single layer, 62 µm thick transfer adhesive (prepared via solvent coating as described in Example 2 from Adhesive 1) was used to laminate the substrates. After vacuum lamination and autoclaving, no bubbles were observed.

Example 5

Example 5 was identical to Example 4, except a single layer, 75 µm thick transfer adhesive (prepared via solvent coating as described in Example 3 from Adhesive 1) was used to laminate the substrates. After vacuum lamination and autoclaving, no bubbles were observed.

Example 6

Example 6 was identical to Example 4, except the autoclave procedure was replaced by a short annealing step at 80° C. for 5 minutes. After annealing, no bubbles were observed.

Example 7

Example 7 was identical to Example 5, except the autoclave procedure was replaced by a short annealing step at 80° C. for 5 minutes. After annealing, no bubbles were observed.

Example 8

An acrylic sheet having an ink step was laminated to a glass substrate using Transfer Adhesive 3 and a 150 µm thick adhesive transfer tape, 8196 (available under the trade designation 3M Adhesive Transfer Tape 8196 from the 3M Company, St. Paul, Minn.) as follows. A liner was removed from Transfer Adhesive 3 and it was laminated to a piece of Adhesive Transfer Tape 8196, also having one release liner removed, forming a multi-layer adhesive having release liners on opposing surfaces. An acrylic sheet (available under the trade designation ACRYLITE MR-200 from Mitsubishi Rayon Co., Ltd., Tokyo, Japan), 45 mm×65 mm×0.8 mm, was printed with a print gap along its outer perimeter, forming a rectangular shaped cavity on the surface of the acrylic sheet. Along each length of the sheet, the print gap was about 5 mm wide. Along one width of the sheet, the print gap was about 2 mm wide while along the opposite edge, the print gap was about 6 mm wide. The thickness of the print gap was about 20 µm. A glass panel, 50 mm×80 mm×0.7 mm (available under the trade designation EAGLE 2000 GLASS from Corning Inc., Corning, N.Y.) was used as the glass substrate. The multi-layer adhesive tape was cut to the size of the glass panel. A release liner of the multilayer adhesive tape was removed, exposing the Adhesive Transfer Tape 8196, and the mutli-layer adhesive tape was hand laminated to the glass panel using a rubber roller. The remaining release liner from the multi-layer adhesive tape was removed, exposing Adhesive 3 and the acrylic sheet with ink step was laminated to this Adhesive 3 using a vacuum laminator TPL-0209 MH (available from Takatori Corp., Kashihara City, Japan). The laminator process conditions were as follows: pressure 0.01 MPa, lamination time about 5 seconds and vacuum of 30 Pa. After lamination, the laminated construction was placed in an autoclave and treated at 0.5 MPa for 30 minutes. After autoclave treatment, visual inspection of the laminate indicated that the laminate was defect free with no bubbles being observed.

The laminate was exposed to UV radiation by irradiating through the acrylic sheet. A UV curing system, Model F300 (available from Fusion UV Systems Inc., Tokyo, Japan) with an H-bulb (120 W/cm) was used for this procedure. The laminate was exposed to 810 mJ/cm$^2$ for UV-B (280-320 nm) and 141 mJ/cm$^2$ for UV-C (250-260 nm) as measured by UV POWER PUCK® II (available from EIT, Inc., Sterling, Va.). After UV exposure, the laminate was left at room temperature overnight. It was then placed in a constant temperature and humidity chamber at 65° C. and 90% relative humidity for seven days. Upon removal from the chamber, visual inspection of the laminate indicated that the laminate was defect free with no bubbles being observed. A second laminate sample was prepared, as described above. The second laminate was placed in an oven at 85° C. for seven days instead of the temperature/humidity chamber. Upon removal from the oven, visual inspection of the laminate indicated that the laminate was defect free with no bubbles being observed.

Comparative Example CE-1

Comparative example CE-1 was a laminated construction, similar to that described in Example 8. The substrate materials, glass plate and acrylic sheet with ink gap were used. The multilayer adhesive was replaced by a 175 µm thick single layer adhesive, 8197 (available under the trade designation 3M Adhesive Transfer Tape 8197 from the 3M Company). The same lamination equipment and corresponding process parameters and autoclave equipment and corresponding process parameters as Example 8 were used. After removal from the autoclave, the glass/8197/acrylic sheet laminate was visually observed to have some defects, including air gaps/bubbles, particularly in the corners of the ink gap. The laminate was placed in a temperature and humidity chamber at 65° C. and 90% relative humidity for seven days. After the seven days, visual inspection revealed that the defects were bigger than after the autoclaving step and more bubbles were observed near the ink gap.

A second laminate sample was prepared as described above. After removal from the autoclave, the glass/8197/acrylic sheet laminate was visually observed to have some defects, including air gaps/bubbles, particularly in the corners of the ink gap. The second laminate was then placed in an oven at 85° C. for seven days instead of the temperature/humidity chamber. After the seven days, visual inspection indicated that the same defects that existed after autoclaving were still present after heat aging.

Distortion Control Examples

TABLE 1

Materials
Monomers and Initiator

| | |
|---|---|
| 2-EHA | 2-Ethylhexyl acrylate |
| ISTA | Isostearyl acrylate (Osaka Organic Chemical Industry, Ltd.) |
| AA | Acrylic acid |
| AEBP | 4-acryloyloxyethoxybenzophenone |
| V-65 | Thermal initiator (2,2'-Azobis(2,4-dimethylvaleronitrile), Wako Pure Chemical Industries, Ltd.) |

Preparation of PSA Sheet 100

To prepare UV-cross-linkable PSA Sheet 100, an acrylic copolymer of a monomer containing an acrylic acid ester having an UV-cross-linkable site was first synthesized. 4-acryloyloxyethoxybenzophenone (AEBP) was used as the acrylic acid ester having an UV-cross-linkable site. A mixture of 2EHA/ISTA/AA/AEBP equaling 37.5/50.0/12.5/0.95 (parts by mass) was prepared and diluted with a mixed solvent of ethyl acetate/methyl ethyl ketone (EtOAc/MEK=20 mass %/80 mass %) to form a monomer concentration of 45 mass %. V-65 was added as an initiator in a ratio of 0.2 mass % based on monomer components and the system was nitrogen-purged for 10 minutes. Subsequently, the reaction was allowed to proceed in a constant temperature bath at 50° C. for 24 hours. As a result, a transparent viscous solution was obtained. The weight average molecular weight of the obtained acrylic copolymer was 210,000 (in terms of polystyrene by gel permeation chromatography).

This polymerization solution was coated on a 50 μm-thick release film (heavy release surface of Cerapeel MIB(T) produced by Toray Advanced Film Co., Ltd.) by adjusting the gap of a knife coater to 220 μm and dried in an oven at 100° C. for 8 minutes. The thickness of the PSA after drying was 50 μm. Subsequently, this PSA surface was laminated with a 38 μm-thick release film (Purex (registered trademark) A-31 produced by Teijin DuPont Films Japan Limited) to obtain a UV-cross-linkable PSA sheet.

Preparation of PSA Sheet 200

Composite PSA Sheet 200 was prepared by laminating PSA Sheet 100 prepared above with 3M 8195 tape (pre-cross-linked PSA). The total thickness of the composite PSA was 175 um (7 Mil).

Preparation of Comparative PSA Sheet A

Comparative PSA Sheet A was prepared by irradiating PSA Sheet 100 prepared above with UV. Fusion H-bulb (3000 mJ/cm2) was used for the UV source. Because PSA Sheet 100 was cross-linked by UV irradiation, Comparative PSA Sheet-A is a cross-linked PSA sheet.

Preparation of Comparative PSA Sheet B

175 μm Comparative PSA Sheet B was prepared by laminating 3 sheets of PSA Sheet 100 and a sheet of 25 μm PSA sheet prepared by the same method as PSA Sheet 100. This 175 micron thick laminate made of PSA Sheet 100 was irradiated with UV using a Fusion H-bulb (3000 mJ/cm2), forming Comparative PSA Sheet B.

Example 9

The laminate was prepared by first cleaning the surface of a 53 mm×100 mm×2.0 mm glass plate 50. A polarizer (PL) sheet 52 was then laminated onto the glass plate 50 and PSA Sheet 100 was applied to the polarizer. A microscope cover glass 54 (24 mm×32 mm×0.15 mm) was then put onto PSA Sheet 100 to form the laminate. The laminate (cover glass/PSA/PL-laminated glass plate) was then placed into an autoclave chamber and treated at 0.5 MPa/60° C. for 30 min. Lastly, the laminate was UV irradiated using a Fusion H-bulb (3000 mJ/cm$^2$).

Comparative Example A

The laminate of Comparative Example A was prepared in a similar manner as Example 9 except that Comparative PSA Sheet A was used instead of the PSA Sheet 100, and the UV irradiation step was skipped because Comparative PSA Sheet A was already cross-linked.

Example 10

The laminate of Example 10 was prepared in a similar manner as the laminate of Example 9 except that PSA Sheet 200 was used instead of PSA/Sheet 100. In this laminate, the UV-cross-linkable PSA side faced the Polarizer, while the pre-cross-linked PSA side faced the cover glass.

Comparative Example B

The laminate of Comparative Example B was prepared in a similar manner as the laminate of Example 9 except that Comparative PSA Sheet-B was used instead of PSA Sheet 100 and the UV irradiation step was skipped because Comparative PSA Sheet-B was already cross-linked.

Figure 6:
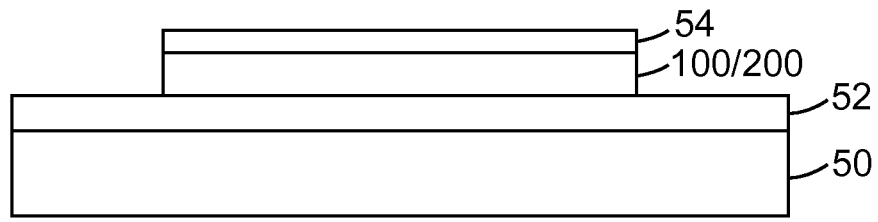
FIG. 6 is a cross-sectional view of a laminate of the present invention.

FIG. 6 shows a cross-sectional view of the laminates of Examples 9 and 10 and Comparative Examples A and B.

Figure 7:
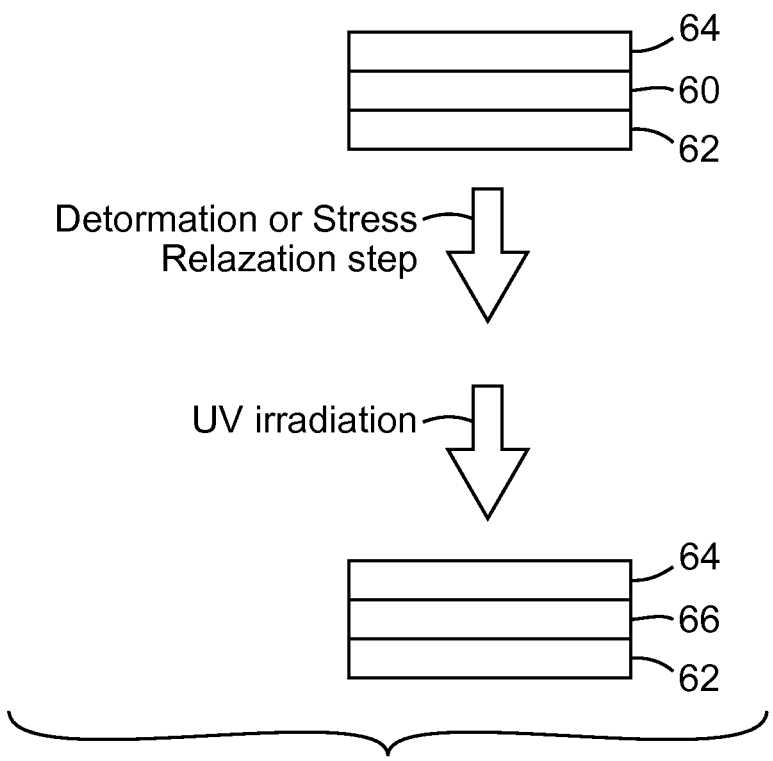
FIG. 7 is a schematic, cross-sectional view of a laminate with a cross-linkable HOCA being treated to form a laminate with a cross-linked pressure sensitive adhesive (PSA).

FIG. 7 shows a schematic, cross-sectional view of a laminate with a cross-linkable HOCA 60 positioned between a glass plate 62 and cover glass 64 being treated to form a laminate with a cross-linked pressure sensitive adhesive (PSA) 66.

Thus, a laminate prepared with a cross-linkable HOCA (Examples 9 and 10) will have a cross-linked PSA positioned between the glass plate and cover glass while a laminate prepared with a pre-cross-linked PSA (Comparative Examples A and B) will have a pre-cross-linked PSA positioned between the glass plate and cover glass.

Deformation Analysis of Example 9 and Comparative Example a

In order to compare the performances of the adhesives of Example 9 and Comparative Example A, the deformation of the laminates were measured using an optical 3-D profiler, Talysurf CCI 6000 (Taylor Hobson Precision) before and after autoclave treatment.

Figure 8A:
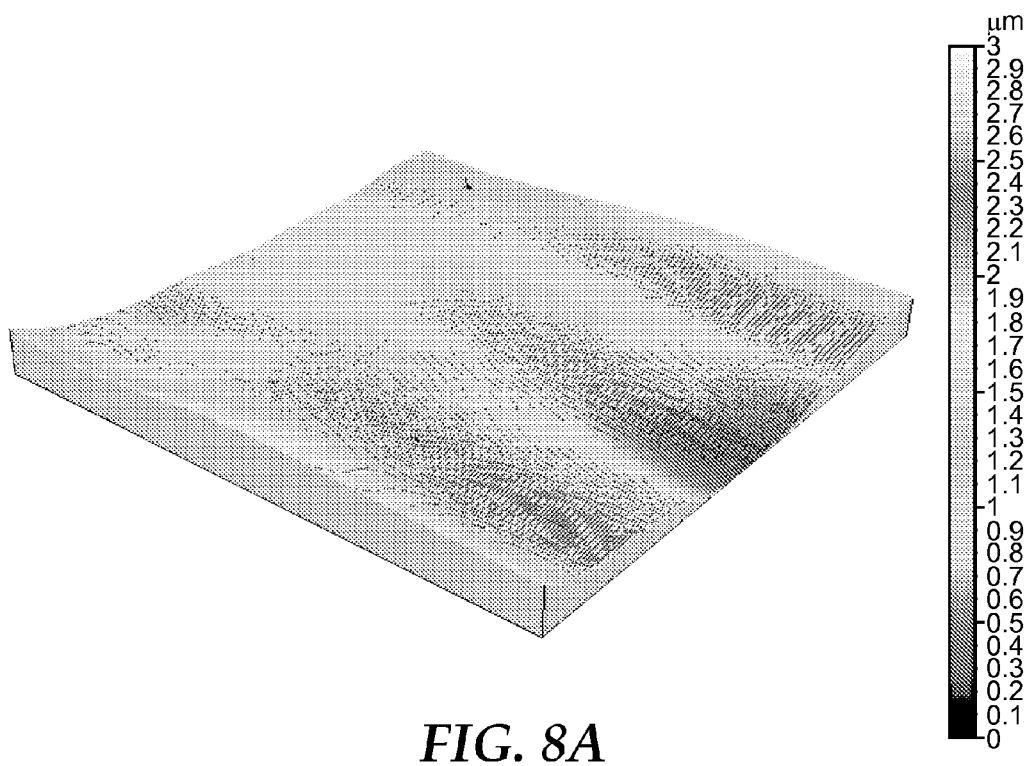
FIG. 8A is a cross-sectional, 3-D view of a first embodiment of a laminate prepared with a HOCA before autoclave treatment.
Figure 8B:
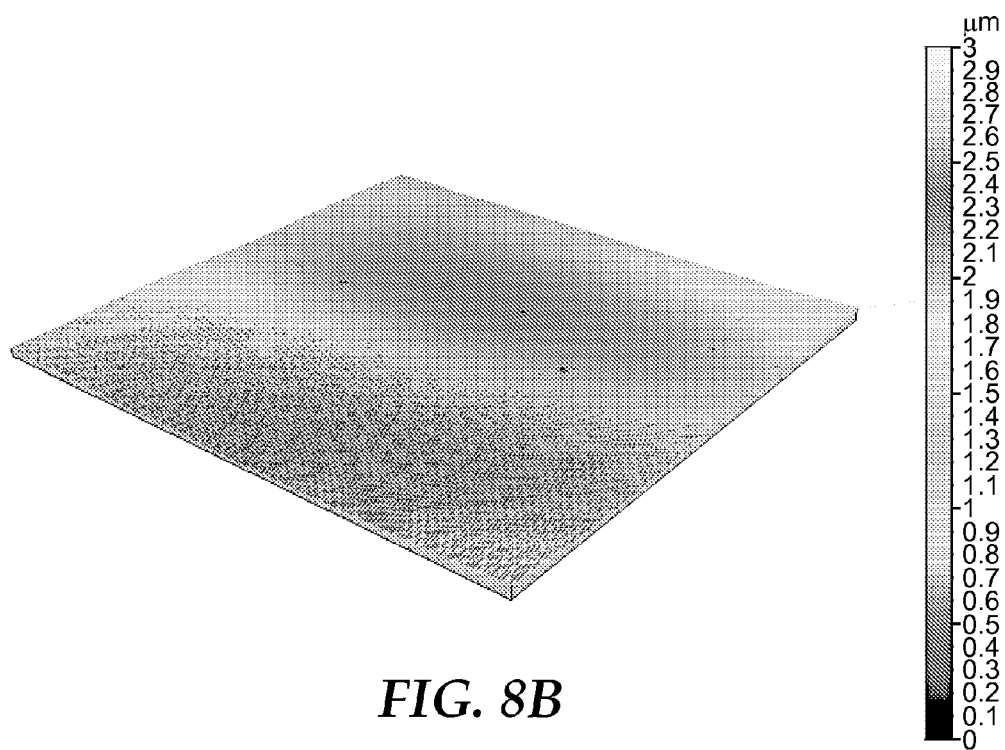
FIG. 8B is a cross-sectional, 3-D view of the first embodiment of the laminate of FIG. 8A prepared with a HOCA after autoclave treatment.
Figure 8C:
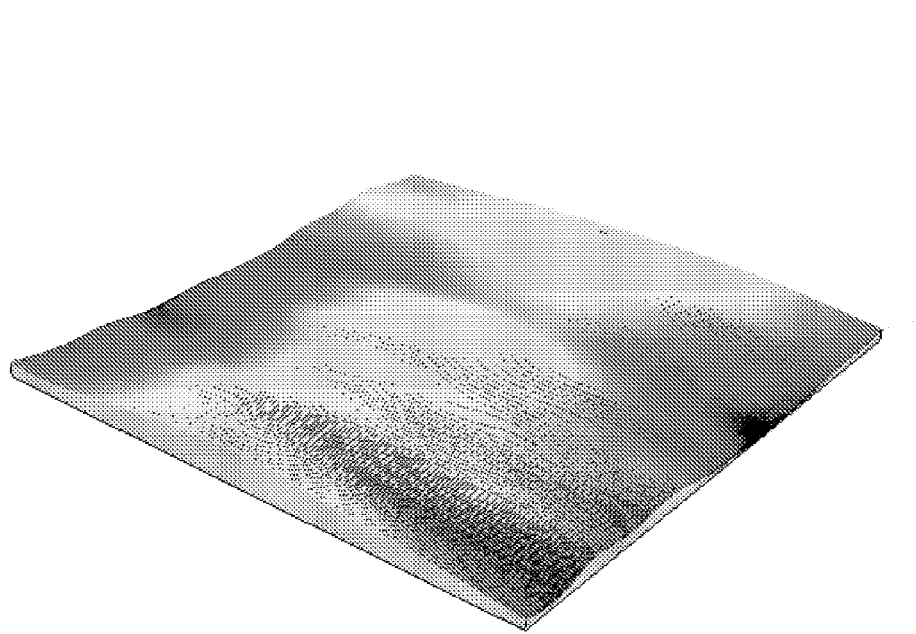
FIG. 8C is a cross-sectional, 3-D view of a first comparative laminate prepared with a pre-cross-linked PSA before autoclave treatment.
Figure 8C:
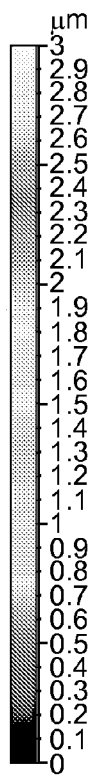
Figure 8D:
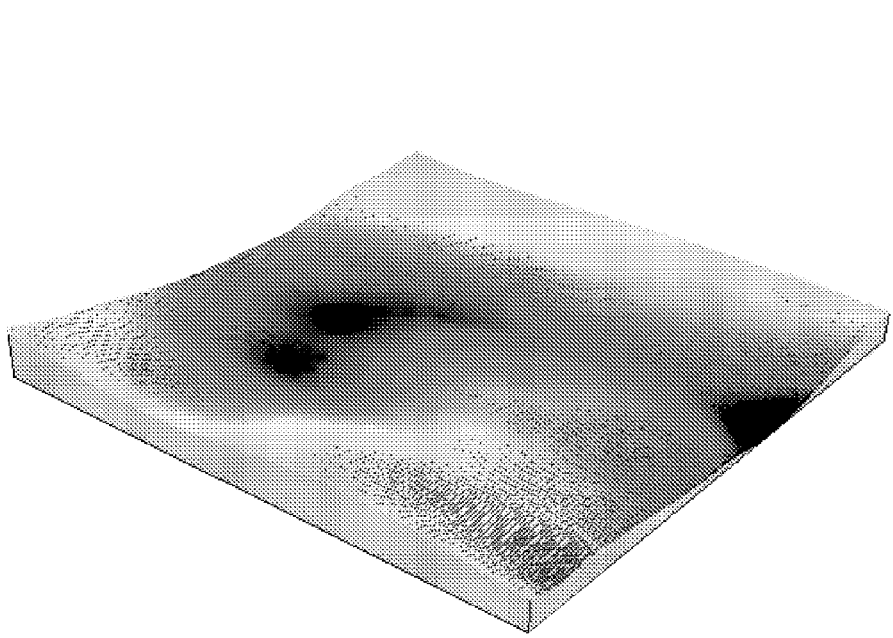
FIG. 8D is a cross-sectional, 3-D view of the first comparative laminate of FIG. 8C prepared with a pre-cross-linked PSA after autoclave treatment.
Figure 8D:
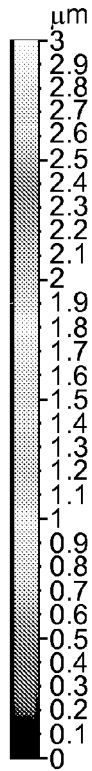
Figure 9A:
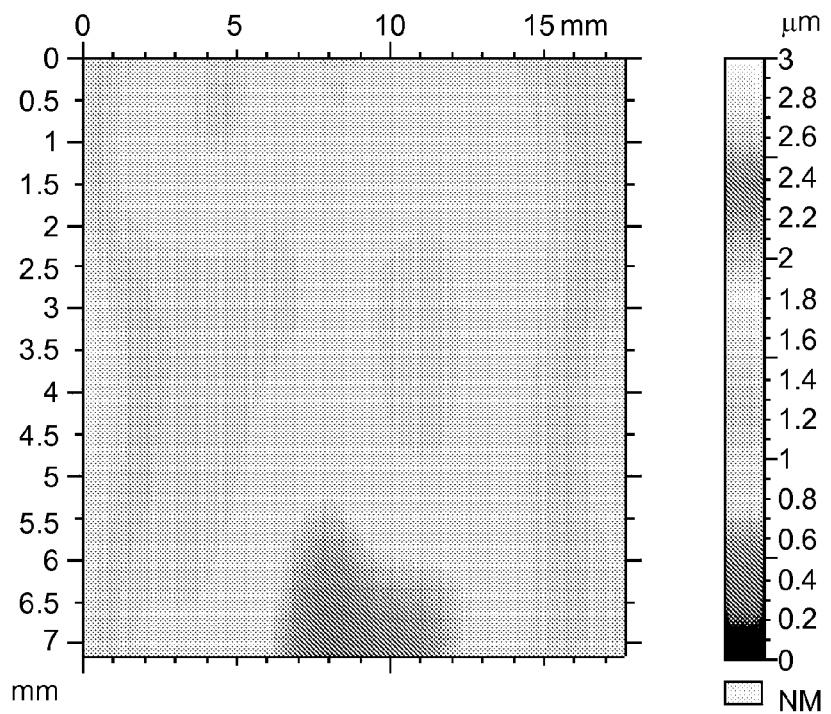
FIG. 9A is a topology map of the first embodiment of the laminate prepared with a HOCA before autoclave treatment.
Figure 9B:
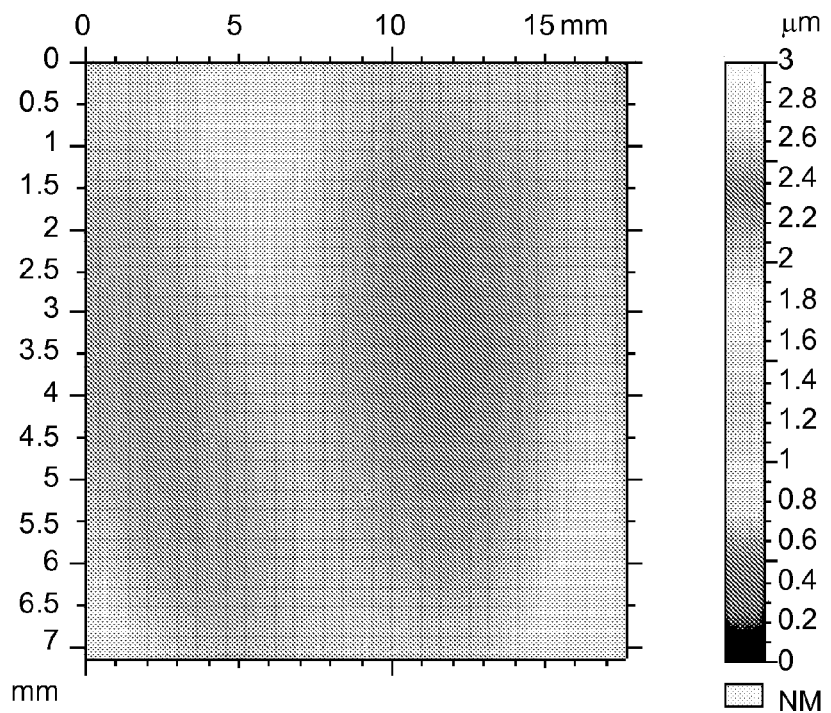
FIG. 9B is a topology map of the first embodiment of the laminate of FIG. 9A prepared with a HOCA after autoclave treatment.
Figure 9C:
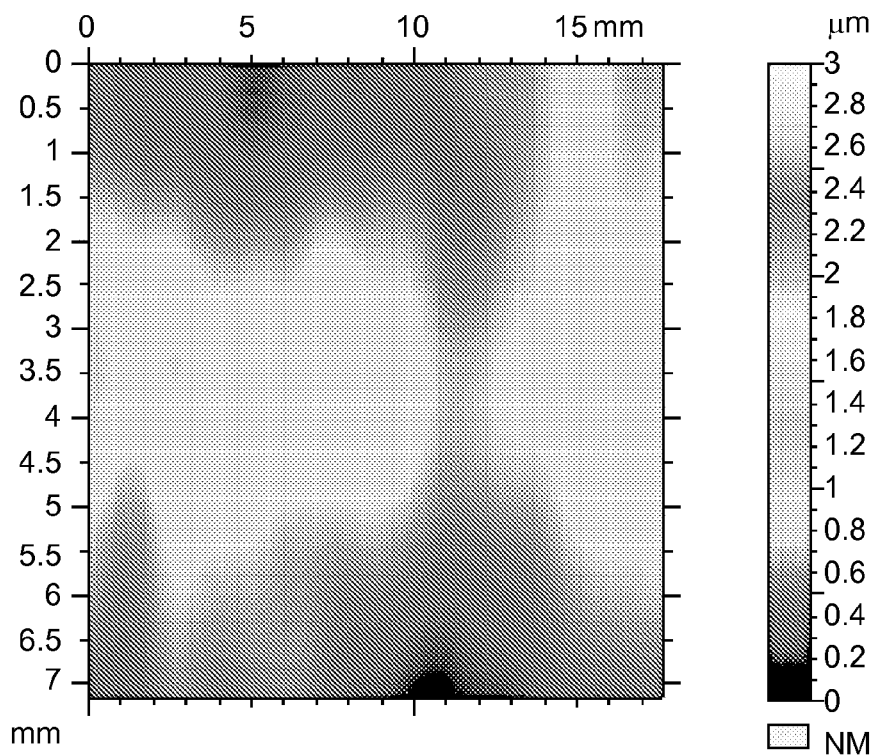
FIG. 9C is a topology map of the first comparative laminate prepared with a pre-cross-linked PSA before autoclave treatment.
Figure 9D:
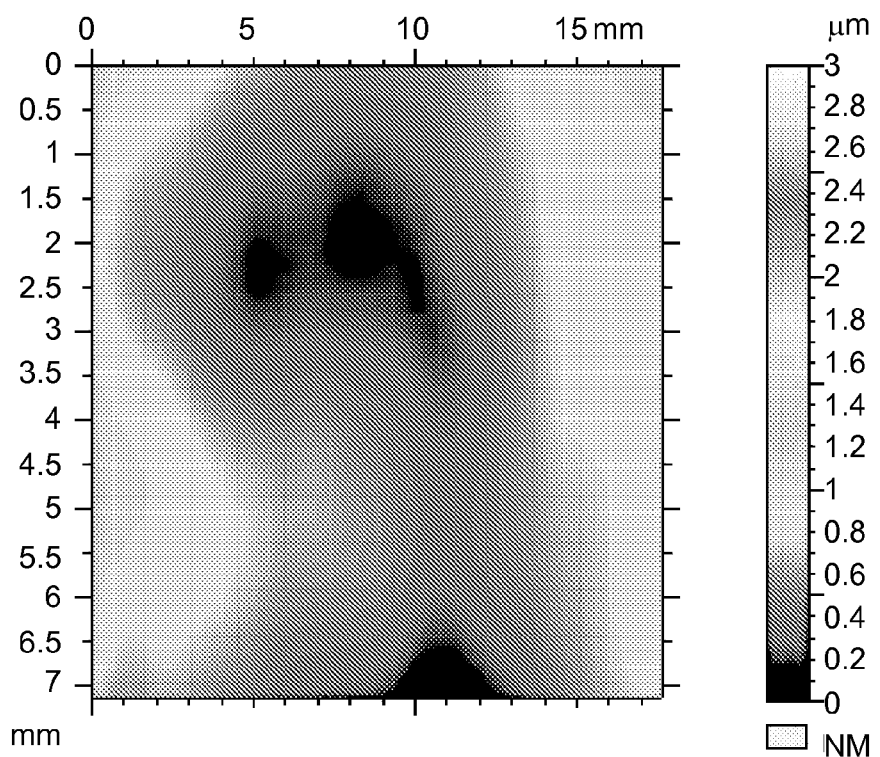
FIG. 9D is a topology map of the first comparative laminate of FIG. 9C prepared with a pre-cross-linked PSA after autoclave treatment.

The laminates were set on the sample stage and the deformation of the top surface of the cover glass was measured. The 3-D profile in the region of 17.5 mm×7 mm was analyzed. The results are shown in FIGS. 8A-8D and 9A-9D. FIGS. 8A and 9A are 3-D cross-sectional and topological profiles of the laminate of Example 9 prepared with a HOCA before autoclave treatment, respectively. FIGS. 8B and 9B are 3-D cross-sectional and topological profiles of the laminate of Example 9 after autoclave treatment, respectively. FIGS. 8C and 9C are 3-D profiles of the laminate of Comparative Example A prepared with a pre-cross-linked PSA before autoclave treatment, respectively. FIGS. 8D and 9D are 3-D profiles of the laminate of Comparative Example A after autoclave treatment, respectively. As shown in FIGS. 8A and 8C and 9A and 9C, the top surfaces of both Example 9 and Comparative Example A, respectively, have slight waviness before autoclave treatment. However, after autoclave treatment, the top surface of the adhesive of Example 9 (UV-cross-linkable PSA) formed a substantially smoother surface than that of the adhesive of Comparative Example A (pre-cross-linked PSA), as shown in FIGS. 8B and 8D and 9B and 9D, respectively. In particular, the surface roughness of the adhesive of Example 9 was improved to Sa=53.4 nm and Ra=0.447 nm from Sa=179.7 nm and Ra=1.243 nm, while the surface roughness of the adhesive of Comparative Example A was almost same (before: Sa=178.6 and Ra=1.216 nm, after: Sa=220.0 nm, Ra=0.866 nm). These results illustrate that the UV-cross-linkable PSA worked effectively to relieve the stress and the deformation of the laminate, while the pre-cross-linked PSA kept considerable stress in it.

Deformation Analysis of Example 10 and Comparative Example B

Figure 10A:
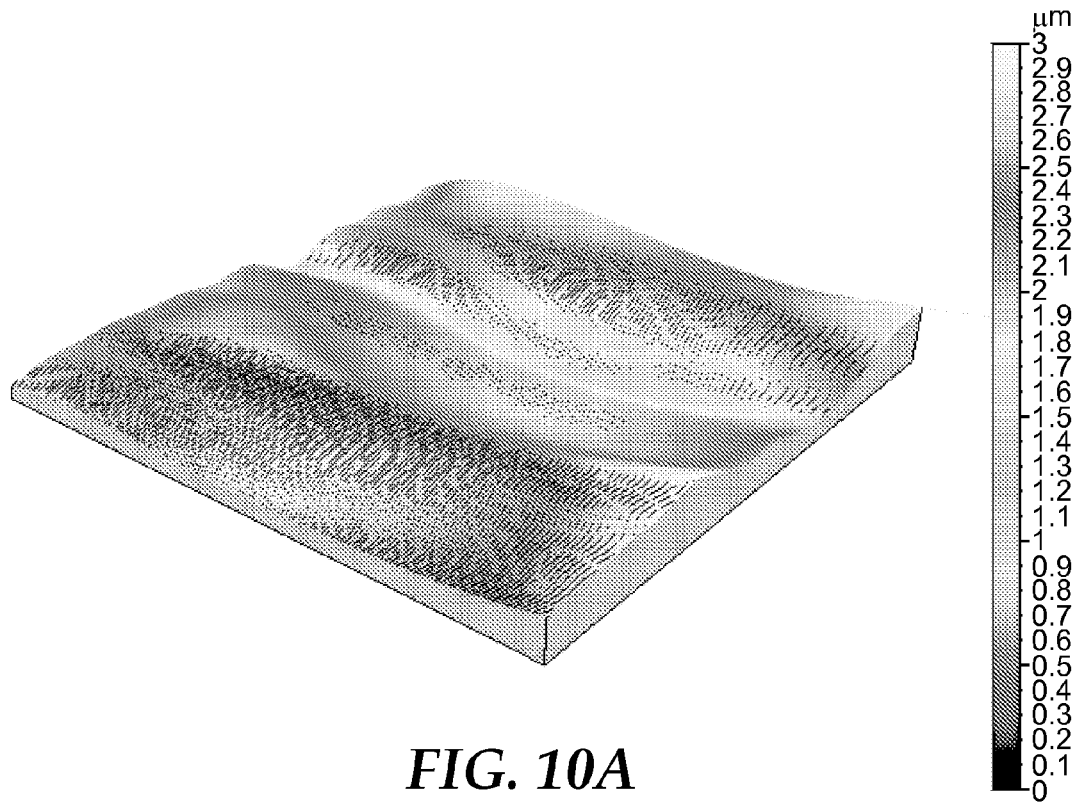
FIG. 10A is a cross-sectional, 3-D view of a second embodiment of a laminate prepared with a HOCA before autoclave treatment.
Figure 10B:
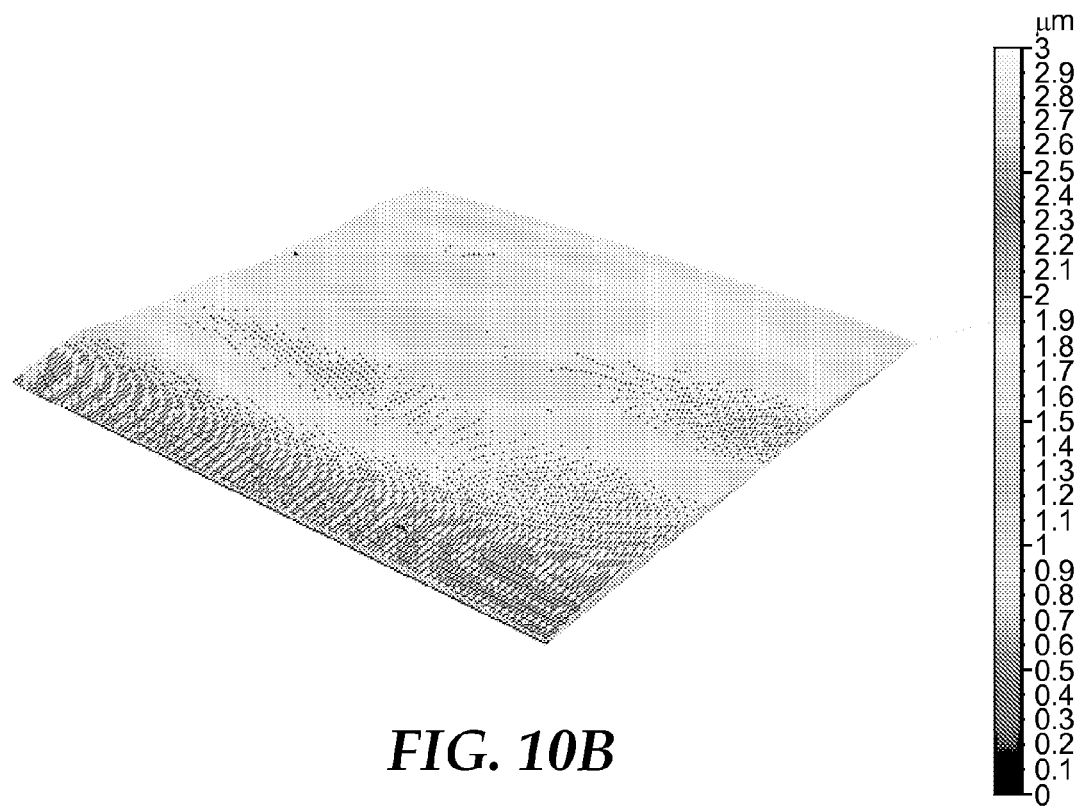
FIG. 10B is a cross-sectional, 3-D view of the second embodiment of the laminate of FIG. 10A prepared with a HOCA after autoclave treatment.
Figure 10C:
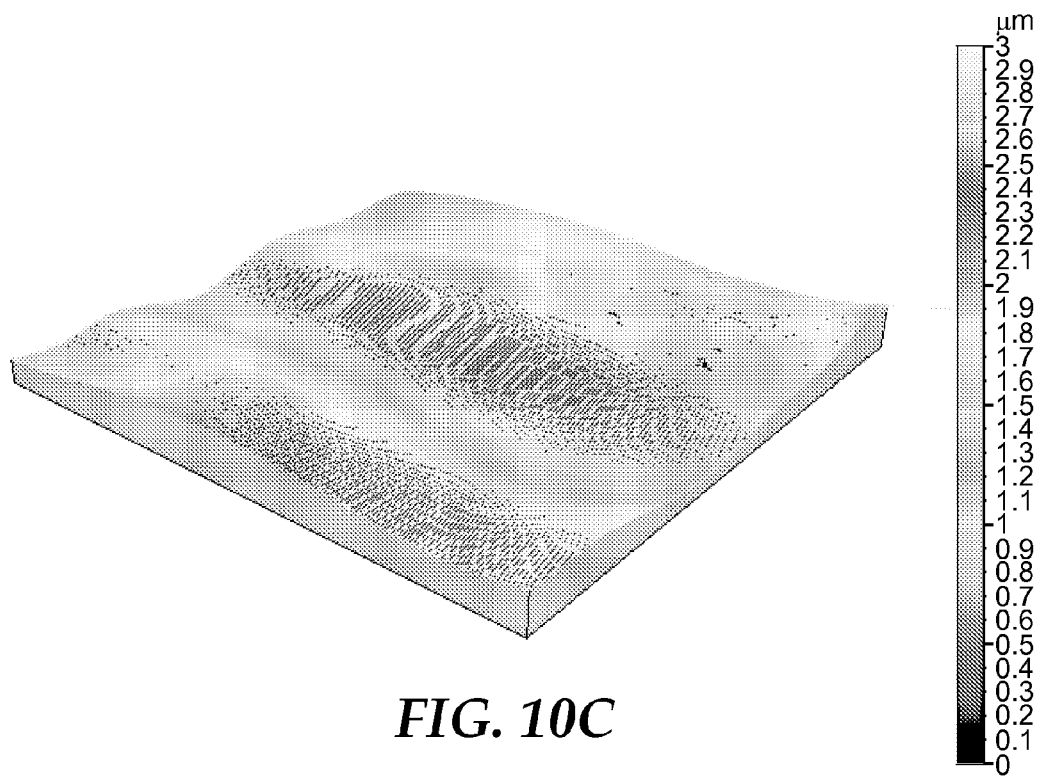
FIG. 10C is a cross-sectional, 3-D view of a second comparative laminate prepared with a pre-cross-linked PSA before autoclave treatment.
Figure 10D:
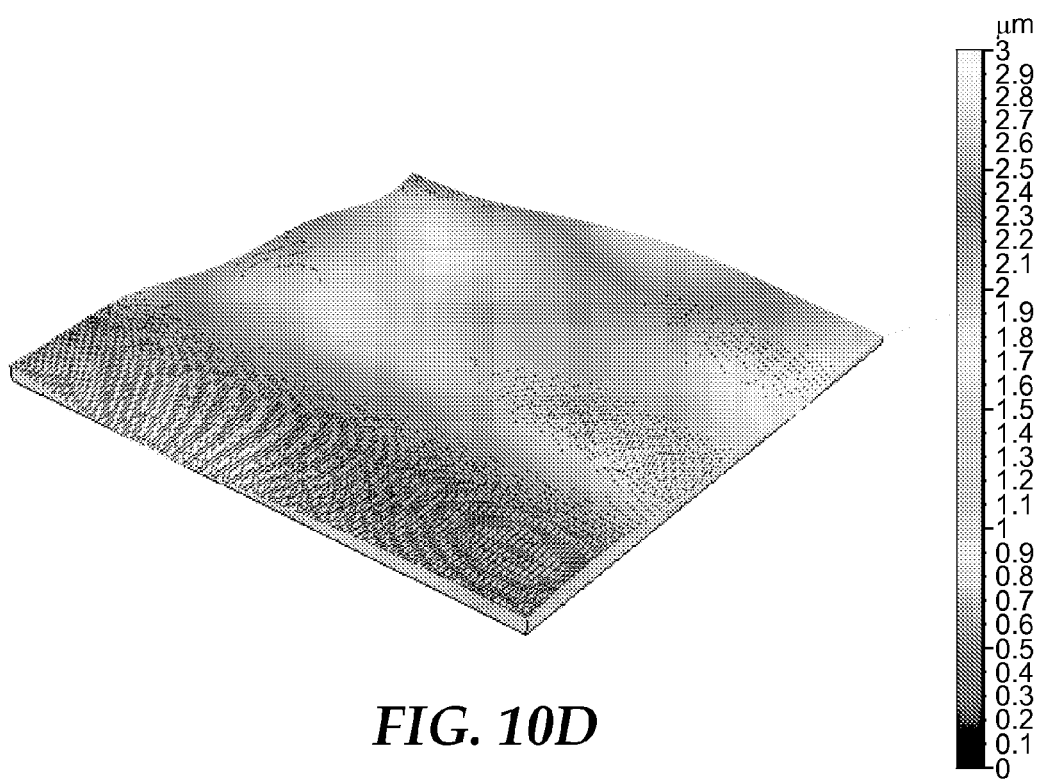
FIG. 10D is a cross-sectional, 3-D view of the second comparative laminate of FIG. 10C prepared with a pre-cross-linked PSA after autoclave treatment.
Figure 11A:
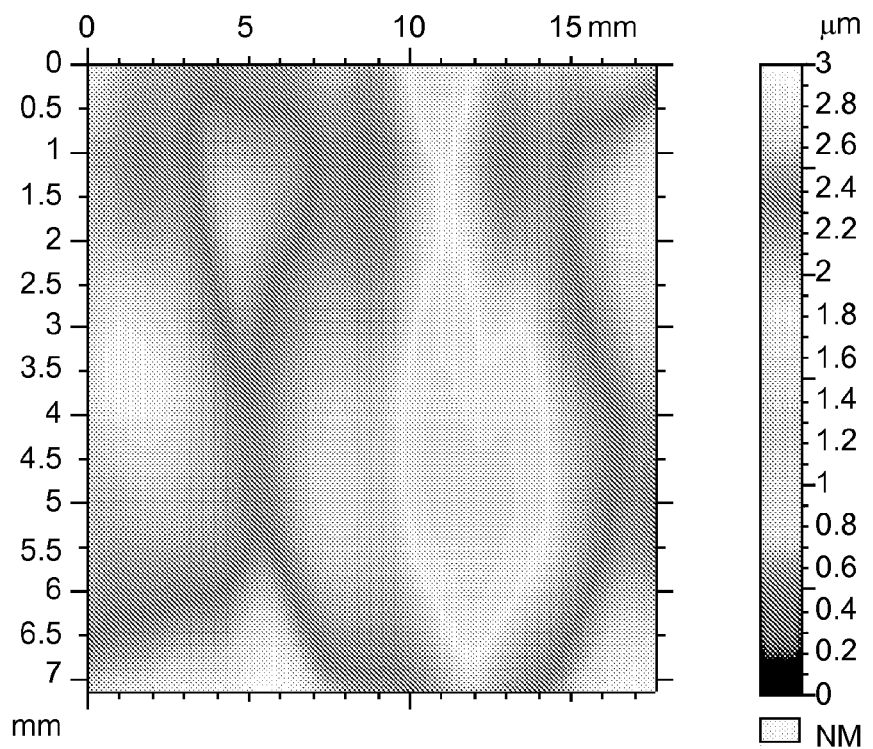
FIG. 11A is a topology map of the second embodiment of the laminate prepared with a HOCA before autoclave treatment.
Figure 11B:
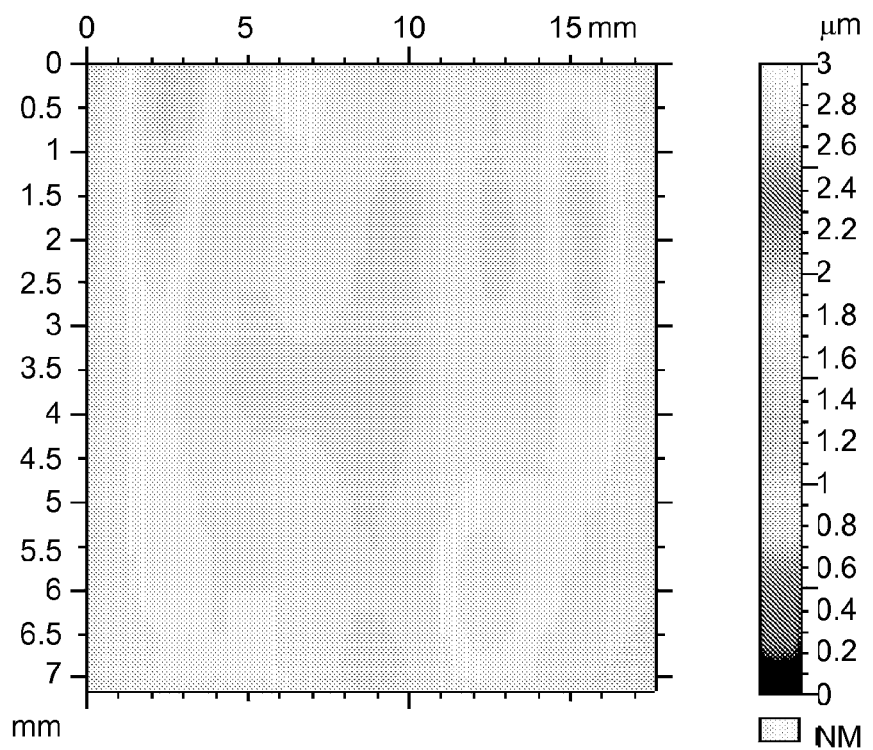
FIG. 11B is a topology map of the second embodiment of the laminate of FIG. 11A prepared with a HOCA after autoclave treatment.
Figure 11C:
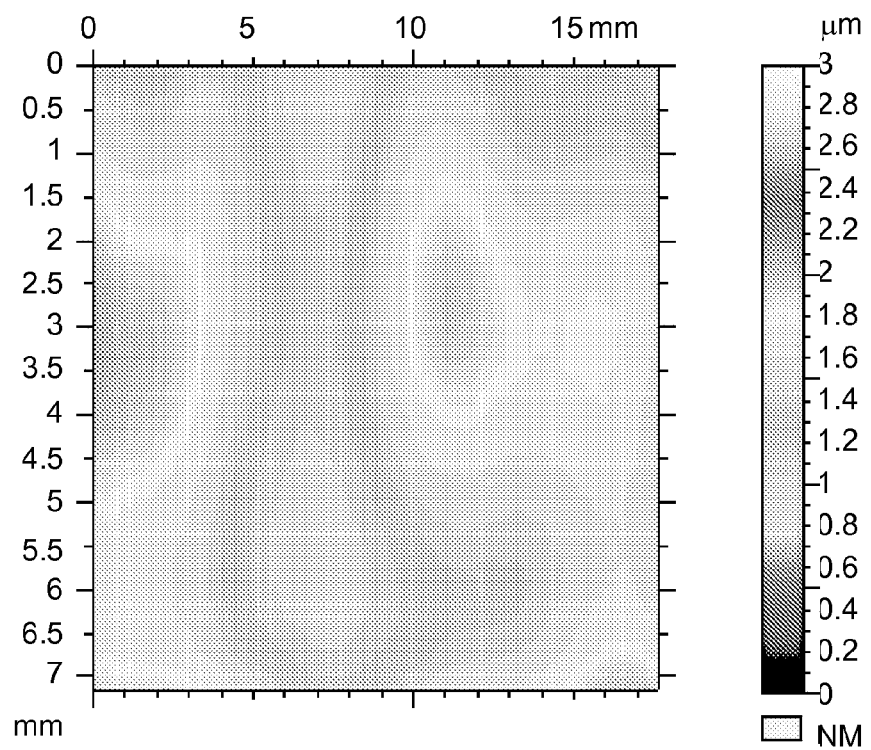
FIG. 11C is a topology map of the second comparative laminate prepared with a pre-cross-linked PSA before autoclave treatment.
Figure 11D:
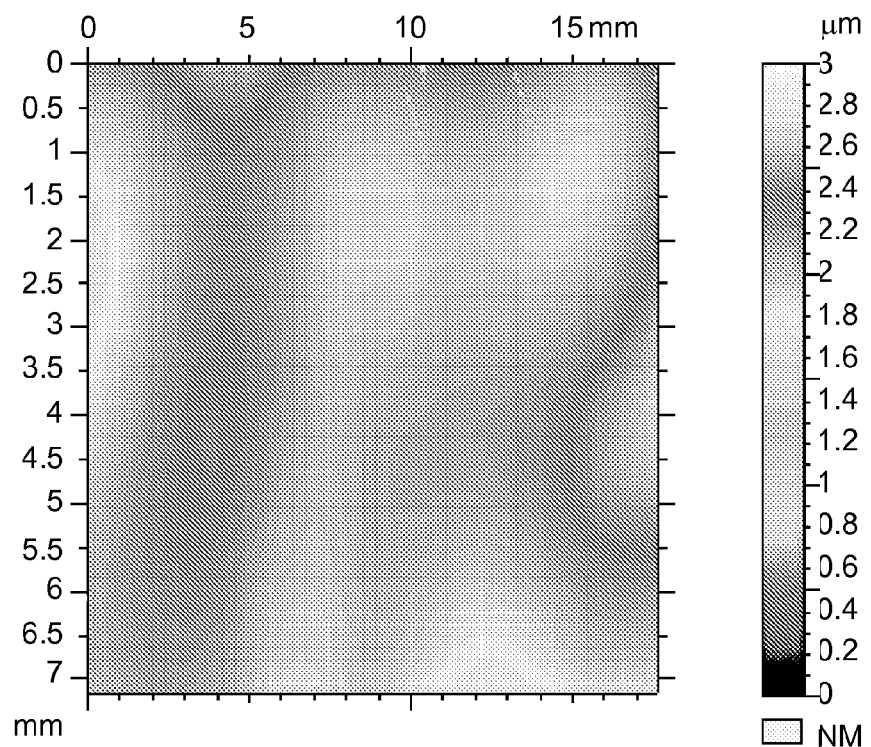
FIG. 11D is a topology map of the second comparative laminate of FIG. 11D prepared with a pre-cross-linked PSA after autoclave treatment.

The 3-D profiles of the laminates of Example 10 and Comparative Example B in the region of 17.5 mm×7 mm were analyzed before and after autoclave treatment. The results are shown in FIGS. 10A-10D and 11A-11D. FIGS. 10A and 11A are 3-D cross-sectional and topological profiles of the laminate of Example 10 prepared with a HOCA before autoclave treatment, respectively. FIGS. 10B and 11B are 3-D cross-sectional and topological profiles of the laminate of Example 10 after autoclave treatment, respectively. FIGS. 10C and 11C are 3-D profiles of the laminate of Comparative Example B, prepared with a pre-cross-linked PSA before autoclave treatment, respectively. FIGS. 10D and 11D are 3-D profiles of the laminate of Comparative Example B after autoclave treatment, respectively. As shown in FIGS. 10A and 10C and 11A and 11C, the top surface of both Example 10 and Comparative PSA Sheet B, respectively, had slight waviness before autoclave treatment. However, after autoclave treatment, the top surface of the adhesive of Example 10 (Composite PSA) formed a substantially smoother surface than that of the adhesive of Comparative Example B (pre-cross-linked PSA) even though the thicknesses of the PSA sheets were the same, 175 µm thick, as shown in FIGS. 10B and 10D and 11B and 11D, respectively. The surface roughness of the adhesive of Example 10 was improved to Sa=78.6 nm and Ra=0.689 nm from Sa=244.0 nm and Ra=1.885 nm, while the adhesive of Comparative Example B was almost same (before: Sa=237.8 nm and Ra=1.362 nm, after: Sa=139.0 nm, Ra=1.075 nm). Again, this illustrates that the UV-cross-linkable PSA worked effectively to relieve the stress and the deformation of the laminate, while the pre-cross-linked PSA kept considerable stress in it.

The surface roughness of the adhesives of Examples 9 and 10 and Comparative Examples A and B are summarized below in the Table 2.

TABLE 2

| | | | Surface Roughness (Sa, Ra) | | | |
|---|---|---|---|---|---|---|
| | | PSA Thickness | Surface roughness before autoclave treatment (nm) | | Surface roughness after autoclave treatment (nm) | |
| | PSA Type | (µm) | Sa | Ra | Sa | Ra |
| Example 9 | UV-cross-linkable PSA | 50 | 179.7 | 1.243 | 53.4 | 0.447 |
| Comp. Example A | Cross-linked PSA | 50 | 178.6 | 1.216 | 220.0 | 0.866 |
| Example 10 | Composite PSA | 175 | 244.0 | 1.885 | 78.6 | 0.689 |
| Comp. Example B | Cross-linked PSA | 175 | 237.8 | 1.362 | 139.0 | 1.075 |

Although the present invention has been described with reference to preferred embodiments, workers skilled in the art will recognize that changes may be made in form and detail without departing from the spirit and scope of the invention.

What is claimed is:

1. A method of making a display assembly, the method comprising:
   (a) attaching a first substrate and a second substrate with an optically clear heat activated adhesive to form a laminate,
   wherein the adhesive has a shear storage modulus of about $5 \times 10^4$ Pa or more at 30° C. and a shear storage modulus of about $5.0 \times 10^4$ Pa or less at 80° C. when measured at a frequency of 1 Hz,
   wherein each of the first and second substrate has opposing major surfaces,
   wherein at least one of the first and second substrates has a three-dimensional surface topography covering at least a portion of one of its major surfaces; and
   wherein at a heat activation temperature, the adhesive is pressure sensitive; and
   (b) heating the laminate to the heat activation temperature of the adhesive, causing the adhesive to flow, wherein the activation temperature is greater than 40° C. and less than 120° C.,
   wherein the adhesive is selected from the group consisting of thermally reversible cross-linkable adhesives and adhesives that are capable of being post cross-linked using irradiation, thermal or moisture curing; and
   wherein after heating the laminate, the adhesive conforms to the three-dimensional surface topography.

2. The method of claim 1 further comprising cross-linking the adhesive after heating.

3. The method of claim 2, wherein cross-linking comprises one of thermal cross-linking, radiation cross-linking and electron beam cross-linking.

4. The method of claim 1, wherein the volume of adhesive used to attach the first and second substrates is up to 110% of the volume defined by an air gap between the first and second substrates.

5. The method of claim 1, wherein at least one of the first substrate and the second substrates is touch panel or a liquid crystal display.

6. The method of claim 1, wherein the surface topography is an ink step located on a perimeter of at least one of the first and second substrates.

7. The method of claim 1, wherein the adhesive is a thermally reversible cross-linkable adhesive selected from the group consisting of: (meth)acrylates, silicones, polyesters, polyurethanes and combinations thereof.

8. The method of claim 1, wherein the adhesive is first laminated to the major surface of the first substrate prior to attaching to the second substrate.

9. The method of claim 1, wherein the attaching step is performed using substantially uniform pressure across the first substrate.

10. The method of claim 1, wherein the adhesive is a multilayer adhesive.

11. A method of making a display assembly, the method comprising:
   (a) attaching a first substrate and a second substrate with an optically clear heat activated adhesive to form a laminate,
   wherein the adhesive has a shear storage modulus of about $5 \times 10^4$ Pa or more at 30° C. and a shear storage modulus of about $5.0 \times 10^4$ Pa or less at 80° C. when measured at a frequency of 1 Hz,
   wherein each of the first and second substrate has opposing major surfaces,
   wherein at least one of the first and second substrates is distortion sensitive;
   wherein at a heat activation temperature, the adhesive is pressure sensitive; and
   (b) heating the laminate to the heat activation temperature of the adhesive causing the adhesive to flow, wherein the activation temperature is greater than 40° C. and less than 120° C.,
   wherein the adhesive is selected from the group consisting of thermally reversible cross-linkable adhesives and post cross-linkable adhesives by means of irradiation, thermal or moisture curing; and
   wherein after heating the laminate, the adhesive covers at least a portion of the distortion sensitive substrate.

12. The method of claim 11, wherein the adhesive is a multilayer adhesive.

13. The method of claim 12, wherein the multilayer adhesive comprises an optically clear adhesive laminated to the amorphous heat activated optically clear adhesive.

14. The method of claim 11 further comprising cross-linking the adhesive after heating.

15. The method of claim 14, wherein cross-linking comprises one of thermal cross-linking, radiation cross-linking and electron beam cross-linking.

16. The method of claim 11, wherein the volume of adhesive used to attach the first and second substrates is up to 110% of the volume defined by an air gap between the first and second substrates.

17. The method of claim 11, wherein at least one of the first substrate and the second substrates is touch panel or a liquid crystal display.

18. The method of claim 11, wherein the adhesive is a thermally reversible cross-linkable adhesive selected from the group consisting of (meth)acrylates, silicones, polyesters, polyurethanes and combinations thereof.

19. The method of claim 11, wherein the adhesive is first laminated to the major surface of the first substrate prior to attaching to the second substrate.

20. The method of claim 11, wherein attaching is performed using substantially uniform pressure across the first substrate.

\* \* \* \* \*

UNITED STATES PATENT AND TRADEMARK OFFICE
CERTIFICATE OF CORRECTION

PATENT NO. : 8,920,592 B2  
APPLICATION NO. : 13/580429  
DATED : December 30, 2014  
INVENTOR(S) : Toshihiro Suwa Page 1 of 1

It is certified that error appears in the above-identified patent and that said Letters Patent is hereby corrected as shown below:

Title Page, Item (73)

<u>Column 1</u>, first page, (Assignee)

Delete "3M Innovation Properties Company," and insert -- 3M Innovative Properties Company, --, therefor.

In the Specification

<u>Column 24,</u>

Line 1, delete "PSA/Sheet" and insert -- PSA Sheet --, therefor.

Signed and Sealed this  
First Day of December, 2015

Michelle K. Lee  
*Director of the United States Patent and Trademark Office*